(12) United States Patent
Shintani et al.

(10) Patent No.: US 11,414,839 B2
(45) Date of Patent: Aug. 16, 2022

(54) DISPLAY CONTROL DEVICE AND METHOD FOR GENERATING TARGET LINE OR CONTROL LINE OF WORK MACHINE

(71) Applicant: KOMATSU LTD., Tokyo (JP)

(72) Inventors: Satoru Shintani, Tokyo (JP); Yoshiki Kami, Tokyo (JP); Yoshito Kumakura, Tokyo (JP)

(73) Assignee: Komatsu Ltd., Tokyo (JP)

( * ) Notice: Subject to any disclaimer, the term of this patent is extended or adjusted under 35 U.S.C. 154(b) by 659 days.

(21) Appl. No.: 16/324,259

(22) PCT Filed: Sep. 8, 2017

(86) PCT No.: PCT/JP2017/032461
§ 371 (c)(1),
(2) Date: Feb. 8, 2019

(87) PCT Pub. No.: WO2019/049309
PCT Pub. Date: Mar. 14, 2019

(65) Prior Publication Data
US 2021/0332566 A1  Oct. 28, 2021

(51) Int. Cl.
*E02F 9/26* (2006.01)
*B60K 35/00* (2006.01)
*G06F 3/14* (2006.01)
*G06T 11/20* (2006.01)
*E02F 3/32* (2006.01)

(52) U.S. Cl.
CPC ............. *E02F 9/261* (2013.01); *B60K 35/00* (2013.01); *G06F 3/14* (2013.01); *G06T 11/203* (2013.01); *B60K 2370/152* (2019.05); *E02F 3/32* (2013.01)

(58) Field of Classification Search
None
See application file for complete search history.

(56) References Cited

U.S. PATENT DOCUMENTS

| | | | |
|---|---|---|---|
| 8,965,642 B2 * | 2/2015 | Johnson | E02F 3/32 701/50 |
| 9,428,885 B2 * | 8/2016 | Nau | E02F 9/265 |
| 9,816,253 B2 * | 11/2017 | Yasuda | E02F 9/261 |
| 2003/0226290 A1 * | 12/2003 | Savard | E02F 9/2037 37/348 |
| 2011/0177845 A1 * | 7/2011 | Fasold | G09B 29/008 455/566 |

(Continued)

FOREIGN PATENT DOCUMENTS

| | | |
|---|---|---|
| JP | 02047432 | 2/1990 |
| JP | 2007085093 | 4/2007 |

(Continued)

*Primary Examiner* — Jason A Pringle-Parker
(74) *Attorney, Agent, or Firm* — Fish & Richardson P.C.

(57) ABSTRACT

A control line determinator determines whether or not a work state of a work implement is a predetermined work state. A display controller generates a display signal including a target surface of a construction object or a control line indicating a surface which is different from the target surface and which a bucket is to be prevented from entering. The display controller makes a display form of the control line or the target surface in the display signal different according to whether or not the work state is the predetermined work state.

13 Claims, 20 Drawing Sheets

(56) References Cited

U.S. PATENT DOCUMENTS

| | | | |
|---|---|---|---|
| 2011/0178677 A1* | 7/2011 | Finley | E02F 9/265 |
| | | | 701/31.4 |
| 2014/0100712 A1* | 4/2014 | Nomura | E02F 9/264 |
| | | | 701/1 |
| 2014/0142817 A1 | 5/2014 | Matsuyama | |
| 2016/0054114 A1* | 2/2016 | Crozier | G01S 19/14 |
| | | | 702/151 |
| 2017/0284070 A1* | 10/2017 | Matsuyama | E02F 9/20 |
| 2017/0314234 A1* | 11/2017 | Paull | E02F 9/2228 |
| 2018/0002899 A1* | 1/2018 | Morimoto | E02F 9/26 |
| 2019/0003152 A1* | 1/2019 | Nakamura | E02F 9/264 |

FOREIGN PATENT DOCUMENTS

| | | |
|---|---|---|
| JP | 2009179968 | 8/2009 |
| JP | A-2016-102312 | 6/2016 |
| WO | WO20121279 | 9/2012 |
| WO | WO2012127912 | 9/2012 |

* cited by examiner

DISPLAY CONTROL DEVICE AND METHOD FOR GENERATING TARGET LINE OR CONTROL LINE OF WORK MACHINE

CROSS-REFERENCE TO RELATED APPLICATIONS

This application claims priority to International Application No. PCT/JP2017/032461 filed on Sep. 8, 2017, the contents of which are incorporated herein in their entirety.

TECHNICAL FIELD

The present invention relates to a work machine having a work implement, a display control device provided in the work machine, and a display control method.

BACKGROUND ART

A construction machine having a work implement which moves a bucket along a design surface indicating a target shape of an object to be excavated upon determining that the work mode is a shaping work and stops the bucket at a predetermined position with reference to the design surface upon determining that the work mode is a cutting edge alignment work has been disclosed (for example, see Patent Literature 1).

CITATION LIST

Patent Literature

[Patent Literature 1]
PCT International Publication No. WO2012/127912

SUMMARY OF INVENTION

Technical Problem

When forming a slope, the bucket is moved with the slope as a target shape. In this case, two types of work, excavation of an object and rolling of an excavated slope, are required. In this case, the slope is formed by, for example, a method of excavating the object leaving a rolling area and then rolling the object with the bucket up to a target position of the slope over the rolling area. In the case in which a slope is formed by such a method with the work implement being controlled such that the work implement does not enter a target shape of a finished object to be constructed, an excavation work is performed after a control target is set at a position, for example, offset upward from the target position of the slope to perform the excavation leaving a rolling area, and a rolling work is performed with the control target set at the original target position of the slope (with the offset removed) after the excavation work ends. Therefore, when the excavation work and the rolling work are repeatedly performed, the operator of the work machine needs to switch the position at which the control target of the work implement is to be set a number of times. Thus, the operator of the work machine needs to set a control target each time the work is switched, which complicates the work.

An aspect of the present invention is to prevent confusion of the operator of the work machine when the control line of the work machine is switched between states with and without an offset.

Solution to Problem

According to a first aspect of the present invention, a display control device for a work machine that has a work implement including a bucket and that is configured to construct a construction object includes a display controller configured to generate a display signal including at least one of a target line of the construction object and a control line indicating a line which is different from the target line and which the bucket is to be prevented from entering and to make a display form of at least one of the control line and the target line in the display signal different according to whether or not a work state of the work machine is a predetermined work state.

Advantageous Effects of Invention

According to the above aspect, it is possible to prevent confusion of the operator of the work machine when the control line of the work machine is switched between states with and without an offset.

DESCRIPTION OF EMBODIMENTS

Figure 1:
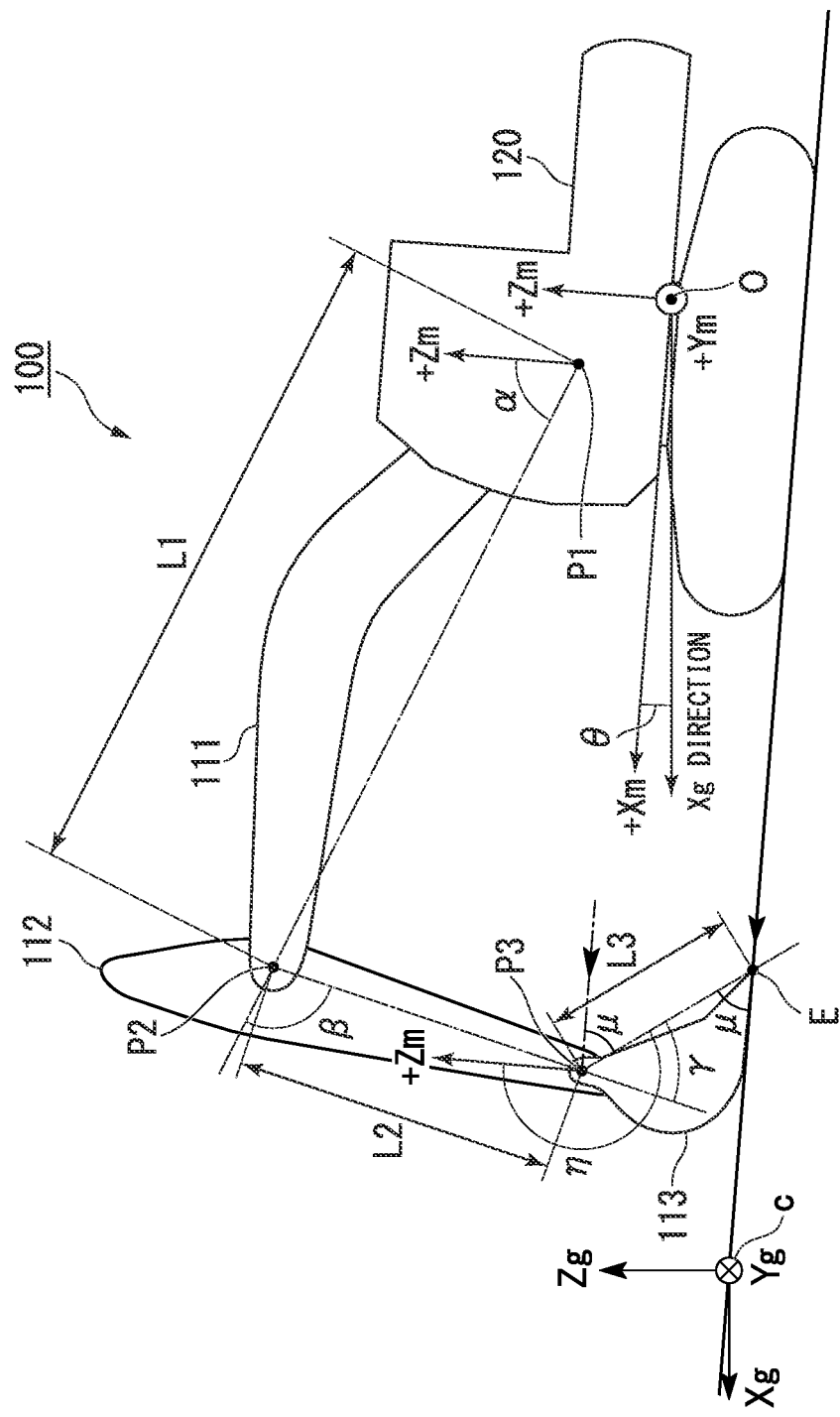
FIG. 1 is a diagram showing an example of an attitude of a work implement.

Hereinafter, embodiments will be described in detail with reference to the drawings.
<Coordinate Systems>
FIG. 1 is a diagram showing an example of the attitude of a work implement.

In the following description, a three-dimensional site coordinate system (Xg, Yg, Zg) and a three-dimensional vehicle body coordinate system (Xm, Ym, Zm) are defined and positional relationships will be described on the basis of these coordinate systems.

The site coordinate system is a coordinate system composed of an Xg axis extending north and south, a Yg axis extending east and west, and a Zg axis extending in the vertical direction with the position of a GNSS reference station provided at the construction site as a reference point. Examples of the GNSS include a global positioning system (GPS).

The vehicle body coordinate system is a coordinate system composed of an Xm axis extending in forward and backward directions, a Ym axis extending in leftward and rightward directions, and a Zm axis extending in upward and downward directions with reference to a representative point O defined on a turning body 120 of a hydraulic excavator 100 which will be described later. With reference to the representative point O on the turning body 120, the forward direction is referred to as a +Xm direction, the rearward direction as a −Xm direction, the leftward direction as a +Ym direction, the rightward direction as a −Ym direction, the upward direction as a +Zm direction, and the downward direction as a −Zm direction.

A work implement control device 126 of the hydraulic excavator 100 which will be described later can convert a position in one coordinate system into a position in another coordinate system through calculation. For example, the work implement control device 126 can convert a position in the vehicle body coordinate system into a position in the site coordinate system and can also convert a position in the site coordinate system into a position in the vehicle body coordinate system.

First Embodiment

Figure 2:
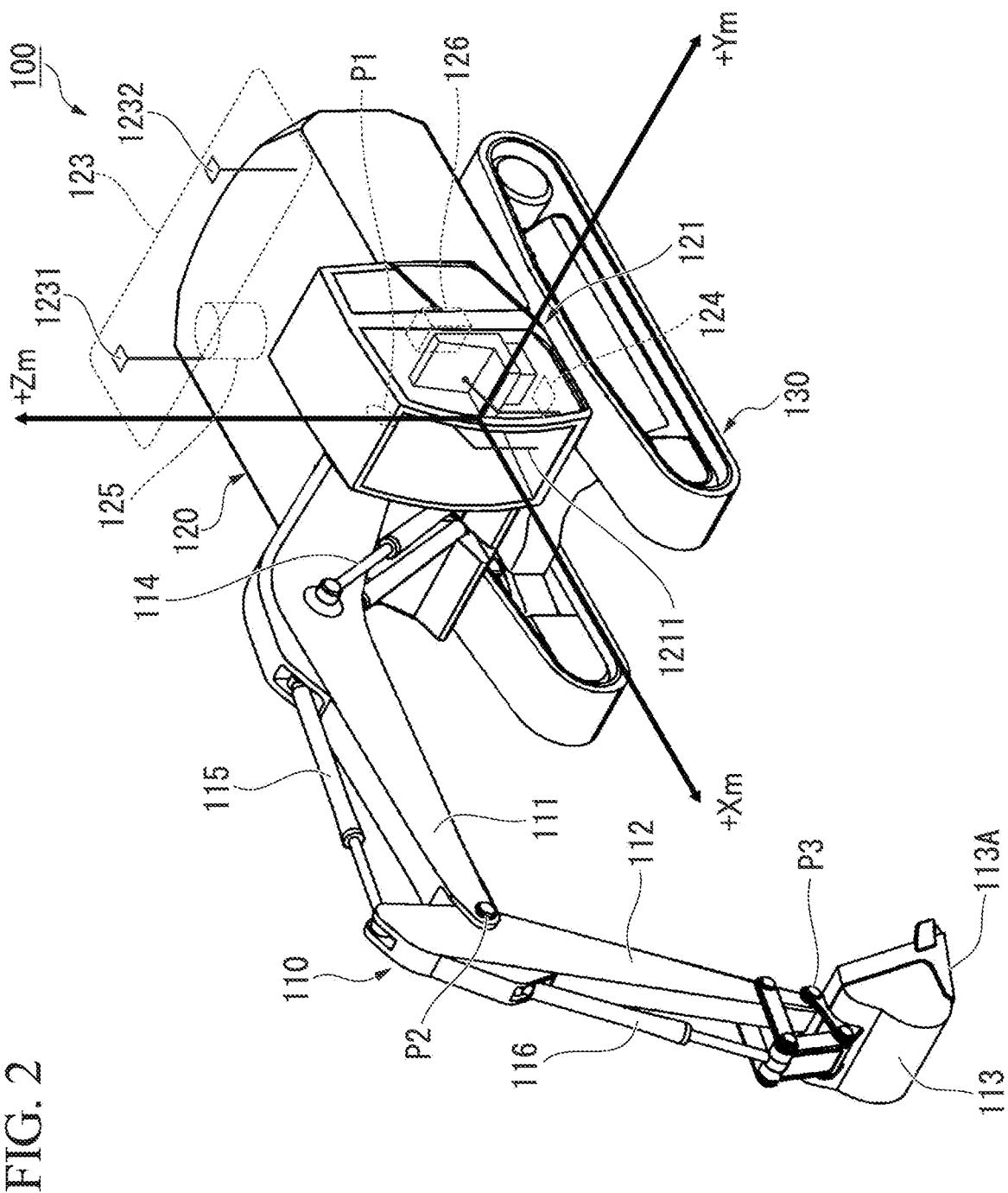
FIG. 2 is a perspective view showing a configuration of a hydraulic excavator according to a first embodiment.

<<Hydraulic Excavator>>
FIG. 2 is a perspective view showing a configuration of a hydraulic excavator according to a first embodiment. In the first embodiment, the hydraulic excavator 100 will be described as an example of the work machine. It is to be noted that the work machine according to other embodiments is not necessarily the hydraulic excavator 100.

The hydraulic excavator 100 includes a work implement 110 that is actuated by hydraulic pressure, a turning body 120 that supports the work implement 110, and a traveling body 130 that supports the turning body 120.

The work implement 110 includes a boom 111, an arm 112, a bucket 113, a boom cylinder 114, an arm cylinder 115, and a bucket cylinder 116.

The boom 111 is attached to the turning body 120 and supports the arm 112. A proximal end portion of the boom 111 is attached to a front portion of the turning body 120 via a boom pin P1.

The arm 112 connects the boom 111 and the bucket 113. A proximal end portion of the arm 112 is attached to a distal end portion of the boom 111 via an arm pin P2.

The bucket 113 includes a blade for excavating soil or the like and a container for conveying the excavated soil. The bucket 113 has a bucket bottom surface 113A extending from a rear end portion of the blade. A proximal end portion of the bucket 113 is attached to a distal end portion of the arm 112 via a bucket pin P3. It is to be noted that the bucket 113 may also be, for example, a bucket for ground leveling like a slope bucket or a bucket without a container.

The boom cylinder 114 is a hydraulic cylinder for actuating the boom 111. A proximal end portion of the boom cylinder 114 is attached to the turning body 120. A distal end portion of the boom cylinder 114 is attached to the boom 111.

The arm cylinder 115 is a hydraulic cylinder for driving the arm 112. A proximal end portion of the arm cylinder 115 is attached to the boom 111. A distal end portion of the arm cylinder 115 is attached to the arm 112.

The bucket cylinder 116 is a hydraulic cylinder for driving the bucket 113. A proximal end of the bucket cylinder 116 is attached to the arm 112. A distal end portion of the bucket cylinder 116 is attached to the bucket 113.

Figure 3:
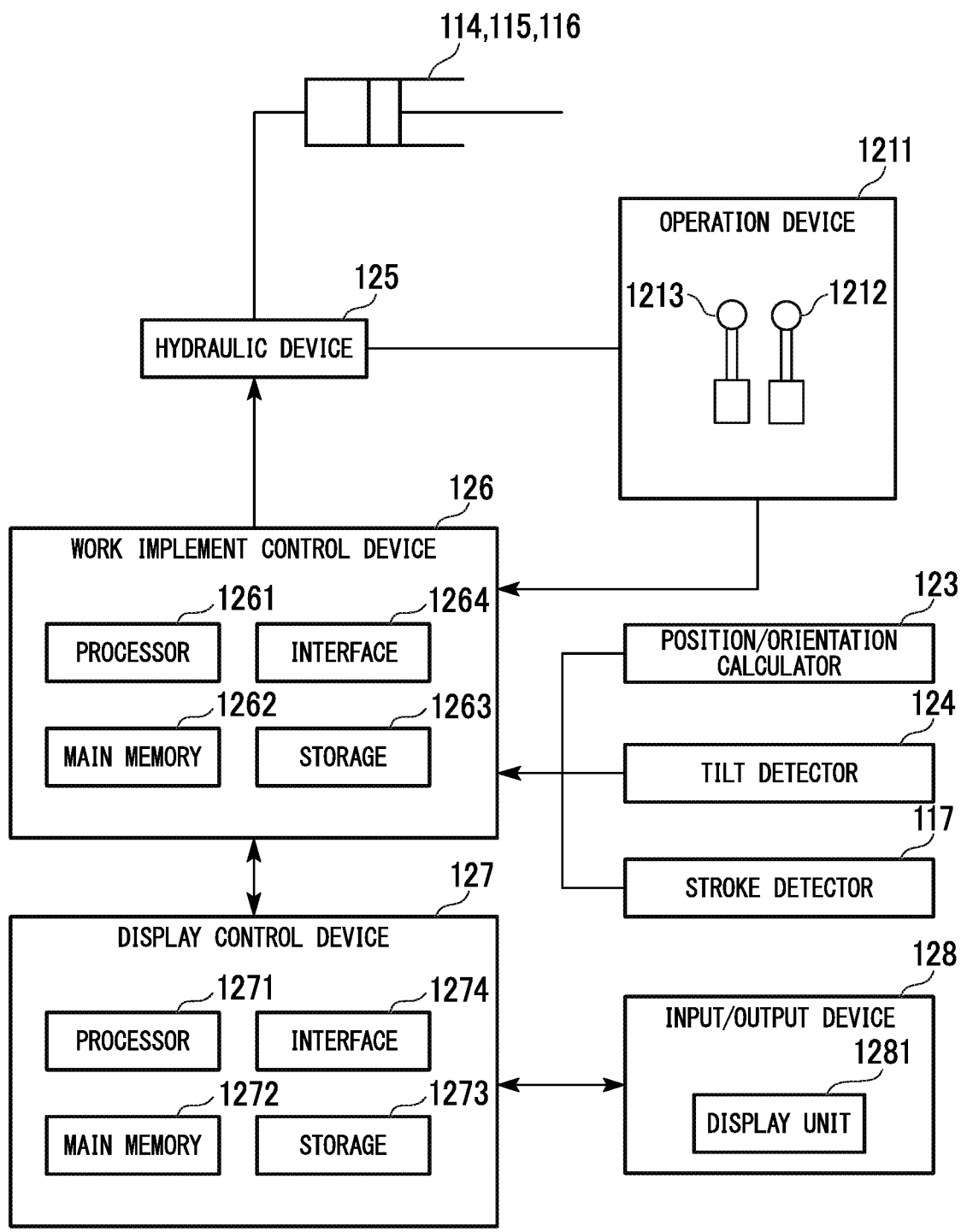
FIG. 3 is a schematic block diagram showing a configuration of a control system for a hydraulic excavator according to the first embodiment.

The turning body 120 is provided with an operator cab 121 which an operator boards. The operator cab 121 is provided in front of the turning body 120 and on the left side (+Ym side) of the work implement 110. An operation device 1211 for operating the work implement 110 is provided inside the operator cab 121. According to the amount of operation of the operation device 1211, actuation oil is supplied to the boom cylinder 114, the arm cylinder 115, and the bucket cylinder 116 to drive the work implement 110.
<<Control System for Hydraulic Excavator>>
FIG. 3 is a schematic block diagram showing a configuration of a control system for the hydraulic excavator according to the first embodiment.

The hydraulic excavator 100 includes a stroke detector 117, an operation device 1211, a position/orientation calculator 123, a tilt detector 124, a hydraulic device 125, a work implement control device 126, a display control device 127, and an input/output device 128.

The stroke detector 117 detects respective stroke lengths of the boom cylinder 114, the arm cylinder 115, and the bucket cylinder 116. Thus, the work implement control device 126 can detect the position and the attitude angle of the work implement 110 in the vehicle body coordinate system on the basis of the respective stroke lengths of the boom cylinder 114, the arm cylinder 115, and the bucket cylinder 116.

The operation device 1211 includes an operation lever 1212 provided on the right side of the operator cab 121 and an operation lever 1213 provided on the left side of the operator cab 121. The operation device 1211 detects the amounts of operation of the operation lever 1212 in the forward and backward directions and in the leftward and rightward directions and the amounts of operation of the operation lever 1213 in the forward and backward directions and in the leftward and rightward directions and transmits operation signals corresponding to the detected operation amounts to the work implement control device 126. The method of generating operation signals by the operation device 1211 according to the first embodiment is a pressure proportional control (PPC) method. In the PPC method, a pilot oil pressure generated by operating each of the operation lever 1212 and the operation lever 1213 is detected by a pressure sensor to generate an operation signal. Operation of the boom 111, operation of the arm 112, operation of the bucket 113, and a turning operation of the turning body 120 are performed by the operation lever 1212 and the operation lever 1213.

The position/orientation calculator 123 calculates the position of the turning body 120 and the direction in which the turning body 120 is oriented. The position/orientation calculator 123 includes a first receiver 1231 and a second receiver 1232 that receive positioning signals from artificial satellites constituting the GNSS. The first receiver 1231 and the second receiver 1232 are installed at different positions on the turning body 120. On the basis of a positioning signal received by the first receiver 1231, the position/orientation calculator 123 detects the position of the representative point O (the origin of the vehicle body coordinate system) of the turning body 120 in the site coordinate system.

The position/orientation calculator 123 calculates the orientation of the turning body 120 as a relationship of the detected installation position of the second receiver 1232 with respect to the detected installation position of the first receiver 1231 using the positioning signal received by the first receiver 1231 and the positioning signal received by the second receiver 1232.

The tilt detector 124 measures the acceleration and the angular speed of the turning body 120 and calculates the attitude of the turning body 120 (for example, the roll representing rotation about the Xm axis, the pitch representing rotation about the Ym axis, and the yaw representing rotation about the Zm axis) on the basis of the measurement result. The tilt detector 124 is installed, for example, on a lower surface of the operator cab 121. Examples of the tilt detector 124 include an inertial measurement unit (TMU).

The hydraulic device 125 includes a hydraulic oil tank, a hydraulic pump, a flow control valve, and an electromagnetic proportional control valve. The hydraulic pump is driven by power of an engine (not shown) to supply hydraulic oil to the boom cylinder 114, the arm cylinder 115, and the bucket cylinder 116 via a flow-regulating valve. The electromagnetic proportional control valve limits the pilot hydraulic pressure supplied from the operation device 1211 on the basis of a control command received from the work implement control device 126. The flow control valve has a rod-like spool and adjusts the flow rate of hydraulic oil supplied to the boom cylinder 114, the arm cylinder 115, and the bucket cylinder 116 according to the position of the spool. The spool is driven by the pilot hydraulic pressure adjusted by the electromagnetic proportional control valve.

The work implement control device 126 specifies the position of the bucket 113 on the basis of the position and orientation calculated by the position/orientation calculator 123, the tilt angle of the turning body 120 detected by the tilt detector 124, and the stroke lengths detected by the stroke detector 117. Further, the work implement control device 126 determines a work mode of the work implement 110 on the basis of the specified attitude of the bucket 113 and a target surface. The work implement control device 126 outputs a control command for the boom cylinder 114, a control command for the arm cylinder 115, and a control command for the bucket cylinder 116 to the electromagnetic proportional control valve of the hydraulic device 125 on the basis of the determined work mode.

The display control device 127 generates a display signal on the basis of a signal from the work implement control device 126 and outputs the generated display signal to the input/output device 128. The display control device 127 outputs an input signal received from the input/output device 128 to the work implement control device 126.

The input/output device 128 displays a screen according to a display signal input from the display control device 127. The input/output device 128 includes a display unit 1281 for displaying a screen. Further, the input/output device 128 generates an input signal according to operation of the user and outputs the generated input signal to the display control device 127. Examples of the input/output device 128 include a touch panel, a monitor, and a portable terminal. The input/output device 128 is an example of the display device. The input/output device 128 may also be integrated with the display control device 127. In this case, the input/output device 128, which is a display device, includes the display control device 127 and the display unit 1281. In another embodiment, the hydraulic excavator 100 may include an input device and an output device individually instead of the input/output device 128. Examples of the input device include a button and a switch. The input device is provided at a position in the operator cab 121 where the operator can operate the input device. For example, the input device may be provided on the operation lever 1212 or on the operation lever 1213.

<<Attitude of Work Implement>>

Here, the attitude of the work implement 110 will be described with reference to FIG. 1. The work implement control device 126 calculates the attitude of the work implement 110 and generates a control command for the work implement 110 on the basis of the attitude. As the attitude of the work implement 110, the work implement control device 126 calculates an attitude angle $\alpha$ of the boom 111 with reference to the boom pin P1, an attitude angle $\beta$ of the arm 112 with reference to the arm pin P2, an attitude angle $\gamma$ of the bucket 113 with reference to the bucket pin P3, and the position of a contour point of the bucket 113 in the vehicle body coordinate system. Hereinafter, the attitude angle $\alpha$ of the boom 111 with reference to the boom pin P1 is simply referred to as an attitude angle $\alpha$ of the boom 111, the attitude angle $\beta$ of the arm 112 with reference to the arm pin P2 is simply referred to as an attitude angle $\beta$ of the arm 112, and the attitude angle $\gamma$ of the bucket 113 with reference to the bucket pin P3 is simply referred to as an attitude angle $\gamma$ of the bucket 113.

The attitude angle $\alpha$ of the boom 111 is represented by an angle formed between a half line extending from the boom pin P1 in the upward direction (+Zm direction) of the turning body 120 and a half line extending from the boom pin P1 to the arm pin P2. It is to be noted that the upward direction (+Zm direction) of the turning body 120 and the vertically upward direction (+Zg direction) do not always coincide with each other, depending on the attitude (pitch angle) θ of the turning body 120.

The attitude angle $\beta$ of the arm 112 is represented by an angle formed between a half line extending from the boom pin P1 to the arm pin P2 and a half line extending from the arm pin P2 to the bucket pin P3.

The attitude angle $\gamma$ of the bucket 113 is represented by an angle formed between a half line extending from the arm pin P2 to the bucket pin P3 and a half line extending from the bucket pin P3 to a cutting edge E of the bucket 113.

Here, the attitude angle $\eta$ of the bucket 113 with reference to the turning body 120 is equal to the sum of the attitude angle $\alpha$ of the boom 111, the attitude angle $\beta$ of the arm 112, and the attitude angle $\gamma$ of the bucket 113. Hereinafter, the attitude angle $\eta$ of the bucket 113 with reference to the turning body 120 is also referred to as an attitude angle $\eta$ of the end of the work implement 110. The attitude angle $\eta$ of the end of the work implement 110 is equal to an angle formed between a half line extending from the bucket pin P3 in the upward direction (+Z direction) of the turning body 120 and a half line extending from the bucket pin P3 to the cutting edge E of the bucket 113.

The position of the cutting edge E of the bucket 113 is obtained from the dimension L1 of the boom 111, the dimension L2 of the arm 112, the dimension L3 of the bucket 113, the attitude angle α of the boom 111, the attitude angle β of the arm 112, the attitude angle γ of the bucket 113, the contour shape of the bucket 113, the position of the representative point O of the turning body 120, and a positional relationship between the representative point O and the pin P1. The dimension L1 of the boom 111 is the distance from the boom pin P1 to the arm pin P2. The dimension L2 of the arm 112 is the distance from the arm pin P2 to the bucket pin P3. The dimension L3 of the bucket 113 is the distance from the bucket pin P3 to the cutting edge E. The positional relationship between the representative point O and the boom pin P1 is represented, for example, by the position of the boom pin P1 in the vehicle body coordinate system. The positional relationship between the representative point O and the boom pin P1 may also be represented, for example, in another coordinate system. For example, the positional relationship between the representative point O and the boom pin P1 may be represented in a polar coordinate system with the representative point O as the origin. The positional relationship between the representative point O and the boom pin P1 may be represented, for example, by the distance from the representative point O to the boom pin P1, a biased angle about the Xm axis of the boom pin P1 with reference to the representative point O, and a biased angle about the Ym axis of the boom pin P1 with reference to the representative point O.

<<Intervention Control>>

The work implement control device 126 determines the work mode of the work implement 110 on the basis of the position of the bucket 113 and the attitude angle η of the end of the work implement 110. Examples of the work mode include an excavation mode and a rolling mode. The excavation mode is a work mode in which soil is excavated by the work implement 110. The rolling mode is a work mode in which the ground is compacted by hitting soil with the bucket bottom surface 113A of the work implement 110. It is to be noted that the work mode is not limited to these in another embodiment.

When the work mode is the excavation mode, the work implement control device 126 limits the speed of the work implement 110 in a direction in which the work implement 110 approaches a construction object such that the work implement 110 does not enter a control line (which will be described later) set at the construction site. The control line is a line which the work implement 110 is to be prevented from entering. Hereinafter, limitation of the speed of the work implement 110 by the work implement control device 126 is also referred to as intervention control. Examples of the control line in the excavation mode include a line set at the position of a target surface which represents a target landform of the construction site or a line spaced apart from the target surface by a predetermined distance (an offset distance). Spacing of the control line apart from the target surface ensures that soil can be excavated leaving a rolling area for compacting the ground between the control line and the target surface through the rolling work of the work implement 110. Thereby, the work implement 110 can leave a uniform soil to be rolled.

When the work mode is the rolling mode, the work implement control device 126 limits the speed of the work implement 110 in the direction in which the work implement 110 approaches the construction object such that the work implement 110 does not enter the target surface at the construction site. That is, the control line in the rolling mode is set at the same position as that of the target surface at the construction site. Making the position of the control line coincide with the position of the target surface ensures that it is possible to compact a construction object up to the position of the target surface by hitting the ground with the bucket bottom surface 113A of the work implement 110.

In the intervention control, the work implement control device 126 generates a control command for the boom cylinder 114 and outputs the control command to the electromagnetic proportional control valve of the hydraulic device 125 such that the work implement 110 does not enter the control line. Thereby, the boom 111 is driven such that the speed of the bucket 113 becomes a speed corresponding to the distance between the bucket 113 and the control line. That is, the work implement control device 126 limits the speed of the bucket 113 by causing the boom 111 to be raised according to the control command for the boom cylinder 114.

It is to be noted that a control command for the arm cylinder 115 or a control command for the bucket cylinder 116 may also be output in the intervention control in another embodiment. That is, the speed of the bucket 113 may be limited by raising the arm 112 or may be directly limited in the intervention control in another embodiment.

<<Work Implement Control Device>>

The work implement control device 126 includes a processor 1261, a main memory 1262, a storage 1263, and an interface 1264.

A program for controlling the work implement 110 is stored in the storage 1263. Examples of the storage 1263 include a hard disk drive (HDD) and a nonvolatile memory. The storage 1263 may be an internal medium that is directly connected to a bus of the work implement control device 126 or may be an external medium that is connected to the work implement control device 126 via the interface 1264 or a communication line.

The processor 1261 reads the program from the storage 1263, loads the program into the main memory 1262, and performs processing according to the program. Further, the processor 1261 reserves a storage area in the main memory 1262 according to the program. The interface 1264 is connected to the stroke detector 117, the operation device 1211, the position/orientation calculator 123, the tilt detector 124, the electromagnetic proportional control valve of the hydraulic device 125, the display control device 127, and other peripheral devices, and exchanges signals with the same.

The program may be one for realizing some of the functions which the work implement control device 126 is caused to perform. For example, the program may also be one causing the work implement control device 126 to perform the functions in combination with another program already stored in the storage 1263 or in combination with another program implemented in another device.

Figure 4:
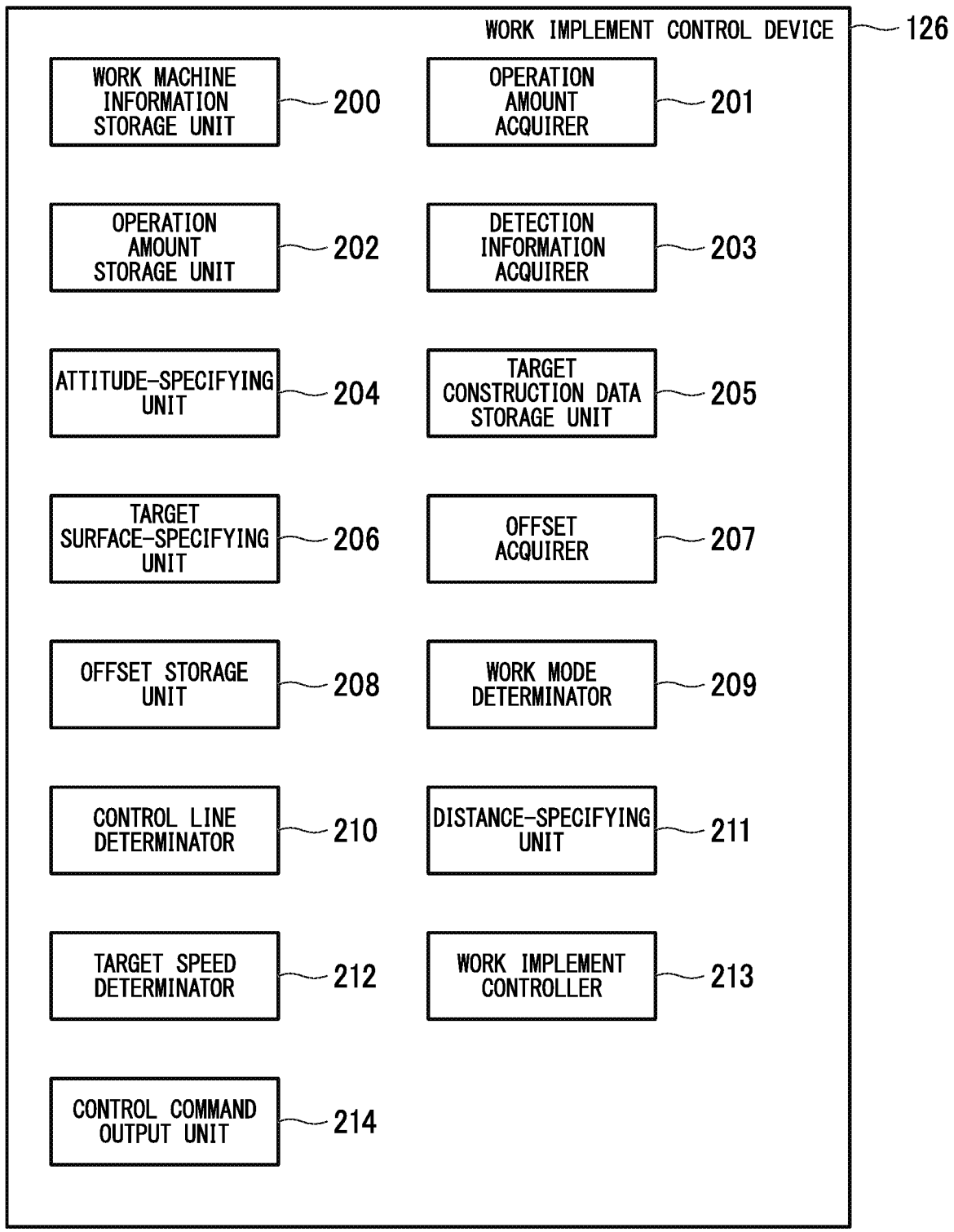
FIG. 4 is a block diagram showing a configuration of a work implement control device according to the first embodiment.

FIG. 4 is a block diagram showing a configuration of the work implement control device according to the first embodiment.

The work implement control device 126 includes a work machine information storage unit 200, an operation amount acquirer 201, an operation amount storage unit 202, a detection information acquirer 203, an attitude-specifying unit 204, a target construction data storage unit 205, a target surface-specifying unit 206, an offset acquirer 207, an offset storage unit 208, a work mode determinator 209, a control line determinator 210, a distance-specifying unit 211, a target speed determinator 212, a work implement controller 213, and a control command output unit 214.

The work machine information storage unit 200 stores the dimension L1 of the boom 111, the dimension L2 of the arm 112, the dimension L3 of the bucket 113, the shape of the bucket 113, and the positional relationship between the boom pin P1 and the position of the representative point O of the turning body 120.

The operation amount acquirer 201 acquires an operation signal indicating an operation amount (the pilot oil pressure or the angle of an electrical lever) from the operation device 1211. For example, the operation amount acquirer 201 acquires an operation amount relating to the boom 111, an operation amount relating to the arm 112, an operation amount relating to the bucket 113, and an operation amount relating to turning.

The operation amount storage unit 202 stores the operation amount relating to the boom 111, the operation amount relating to the arm 112, the operation amount relating to the bucket 113, and the operation amount relating to turning.

The detection information acquirer 203 acquires information detected by each of the position/orientation calculator 123, the tilt detector 124, and the stroke detector 117. For example, the detection information acquirer 203 acquires position information in the site coordinate system of the turning body 120, the direction in which the turning body 120 is oriented, the attitude of the turning body 120, the stroke length of the boom cylinder 114, the stroke length of the arm cylinder 115, and the stroke length of the bucket cylinder 116.

The attitude-specifying unit 204 specifies the attitude angle η of the end of the work implement 110 on the basis of the information acquired by the detection information acquirer 203. The attitude-specifying unit 204 specifies the attitude angle η of the end of the work implement 110 through the following procedure. The attitude-specifying unit 204 calculates the attitude angle α of the boom 111 from the stroke length of the boom cylinder 114. The attitude-specifying unit 204 calculates the attitude angle β of the arm 112 from the stroke length of the arm cylinder 115. The attitude-specifying unit 204 calculates the attitude angle γ of the bucket 113 from the stroke length of the bucket cylinder 116. Then, the attitude-specifying unit 204 calculates the attitude angle η of the end of the work implement 110 by summing the attitude angle α of the boom 111, the attitude angle β of the arm 112, and the attitude angle γ of the bucket 113.

The attitude-specifying unit 204 specifies the position of the cutting edge E of the work implement 110 in the site coordinate system on the basis of the information acquired by the detection information acquirer 203 and the information stored in the work machine information storage unit 200. The attitude-specifying unit 204 specifies the position of the cutting edge E of the work implement 110 in the site coordinate system through the following procedure. The attitude-specifying unit 204 specifies the position of the arm pin P2 in the vehicle body coordinate system on the basis of the attitude angle α of the boom 111 and the dimension L1 of the boom 111 stored in the work machine information storage unit 200. The attitude-specifying unit 204 specifies the position of the bucket pin P3 in the vehicle body coordinate system on the basis of the position of the arm pin P2, the attitude angle β of the arm 112, and the dimension L2 of the arm 112 stored in the work machine information storage unit 200. The attitude-specifying unit 204 specifies the position of the cutting edge E in the vehicle body coordinate system on the basis of the position of the bucket pin P3, the attitude angle γ of the bucket 113, and the dimension L3 of the bucket 113 stored in the work machine information storage unit 200. Then, the attitude-specifying unit 204 converts the position of the cutting edge E in the vehicle body coordinate system into a position in the site coordinate system on the basis of the position information of the turning body 120 in the site coordinate system acquired by the detection information acquirer 203, the direction in which the turning body 120 is oriented, and the attitude of the turning body 120.

Further, the attitude-specifying unit 204 obtains the inclination of the bucket bottom surface 113A in the site coordinate system on the basis of the calculated attitude angle η, the shape of the bucket 113 stored in the work machine information storage unit 200, and the attitude of the turning body 120 detected by the detection information acquirer 203. The inclination of the bucket bottom surface 113A in the site coordinate system is an angle formed, for example, between the bucket bottom surface 113A and the Zg axis. The attitude-specifying unit 204 specifies the inclination of the bucket bottom surface 113A in the site coordinate system through the following procedure. On the basis of the shape of the bucket 113 stored in the work machine information storage unit 200, the attitude-specifying unit 204 obtains an angle μ formed between a straight line connecting the bucket pin P3 and the cutting edge E in the Zm-Xm plane of the vehicle body coordinate system and a line segment representing the bucket bottom surface 113A. The attitude-specifying unit 204 calculates the inclination of the bucket bottom surface 113A in the vehicle body coordinate system by adding the angle μ formed between the straight line connecting the bucket pin P3 and the cutting edge E and the line segment representing the bucket bottom surface 113A to the attitude angle η of the end of the work implement 110. The inclination of the bucket bottom surface 113A in the vehicle body coordinate system is an angle formed between the bucket bottom surface 113A and the Zm axis. Then, the attitude-specifying unit 204 specifies the inclination of the bucket bottom surface 113A in the site coordinate system by adding the inclination of the turning body 120 detected by the detection information acquirer 203 to the inclination of the bucket bottom surface 113A in the vehicle body coordinate system.

The attitude-specifying unit 204 outputs the position of the cutting edge E of the work implement 110 and the inclination of the bucket bottom surface 113A to the display control device 127.

The target construction data storage unit 205 stores target construction data representing a target shape of an object to be excavated at the construction site. The target construction data is three-dimensional data expressed in the site coordinate system such as three-dimensional landform data composed of a plurality of triangular polygons representing the target surface. The triangle polygons constituting the target construction data have sides that are in common with other adjacent triangular polygons. That is, the target construction data represents a continuous plane composed of a plurality of planes. The target construction data is stored in the target construction data storage unit 205 through reading thereof from an external storage medium or through receiving thereof from an external server via a network.

The target surface-specifying unit 206 specifies a target surface on the basis of the target construction data stored in the target construction data storage unit 205 and the position of the cutting edge E of the bucket 113 specified by the attitude-specifying unit 204. For example, from the target construction data, the target surface-specifying unit 206 specifies a surface positioned vertically below the cutting edge E of the bucket 113 or a surface closest to the cutting edge E as a target surface. Further, the target surface-specifying unit 206 specifies the inclination of the target surface in the site coordinate system.

The offset acquirer 207 acquires the offset distance of the control line to the target surface set in the display control device 127.

The offset storage unit 208 stores the offset distance acquired by the offset acquirer 207.

The work mode determinator 209 determines the work mode of the work implement 110 on the basis of the inclination of the bucket bottom surface 113A specified by the attitude-specifying unit 204 and the inclination of the target surface specified by the target surface-specifying unit 206. For example, when the difference between the inclination of the bucket bottom surface 113A and the inclination of the target surface, that is, the angle θ formed between the bucket bottom surface 113A and the target surface, is equal to or greater than a predetermined angle, the work mode determinator 209 determines that the work mode is not the rolling mode, i.e., that it is a non-rolling mode. Since the excavation mode is an example of the non-rolling mode, the following description will be given with reference to the excavation mode. Further, when the angle θ formed between the bucket bottom surface 113A and the target surface is less than the predetermined angle, the work mode determinator 209 determines that the work mode is the rolling mode. For example, during an excavation work, the angle θ formed between the bucket bottom surface 113A and the target surface is great since the work implement 110 is lowered to the construction object with the cutting edge E facing the target surface. On the other hand, during a rolling work, the angle θ formed between the bucket bottom surface 113A and the target surface is small since the work implement 110 is lowered to the construction object with the bucket bottom surface 113A facing the target surface.

The work mode determinator 209 outputs the determined work mode to the display control device 127.

The control line determinator 210 determines a control line indicating a control target of the bucket bottom surface 113A on the basis of the offset distance stored in the offset storage unit 208 and the work mode determined by the work mode determinator 209. When the work mode is the excavation mode, the control line determinator 210 sets the control line at a position shifted by the offset distance in the upward direction (+Zg direction) from the position of the target surface specified by the target surface-specifying unit 206. When the work mode is the rolling mode, the control line determinator 210 sets the control line at the position of the target surface specified by the target surface-specifying unit 206. It is to be noted that, when the work mode is the rolling mode, the work implement control device 126 may not perform the intervention control while the control line determinator 210 does not set the control line in another embodiment. The control line determinator 210 also outputs an offset bit indicating whether or not to display the control line to the display control device 127 on the basis of the work mode determined by the work mode determinator 209. The offset bit indicates 1 when display of the control line is necessary and 0 when display of the control line is unnecessary.

The distance-specifying unit 211 specifies the distance between the cutting edge E of the bucket 113 and the control line.

On the basis of the operation amounts of the operation lever 1212 and the operation lever 1213 acquired by the operation amount acquirer 201, the target speed determinator 212 calculates a target speed of the boom 111 with reference to the turning body 120, a target speed of the arm 112 with reference to the boom 111, and a target speed of the bucket 113 with reference to the arm 112. Hereinafter, the speed of the boom 111 with reference to the turning body 120 is simply referred to as the speed of the boom 111, the speed of the arm 112 with reference to the boom 111 is also simply referred to as the speed of the arm 112, and the speed of the bucket 113 with reference to the arm 112 is also simply referred to as the speed of the bucket 113. In the following description, the speed of the bucket 113 with reference to the turning body 120 is also referred to as the speed of the end of the work implement 110.

On the basis of the distance between the cutting edge E of the bucket 113 and the control line specified by the distance-specifying unit 211, the work implement controller 213 performs intervention control for controlling the work implement 110 such that the bucket 113 does not enter below the control line. The work implement controller 213 determines a speed limit of the boom 111 in the vertical direction on the basis of a speed limit table indicating the relationship between the distance between the cutting edge E of the bucket 113 and the control line and the speed limit of the end of the work implement 110. Examples of the speed limit table include a table in which the vertical component of the speed of the end of the work implement 110 approaches zero as the distance between the cutting edge E of the bucket 113 and the control line approaches zero. Hereinafter, a speed in the vertical downward direction is represented by a positive number and a speed in the vertical upward direction is represented by a negative number. In the present embodiment, the work implement controller 213 determines the speed limit of the boom 111 in the vertical direction. However, the present invention is not limited thereto and, for example, a speed limit in the normal direction may be determined.

When the speed limit in the vertical direction of the end of the work implement 110 is smaller than the sum of the vertical components of the target speeds of the boom 111, the arm 112, and the bucket 113, the work implement controller 213 calculates the speed limit in the vertical direction of the boom 111 by subtracting the vertical component of the target speed of the arm 112 and the vertical component of the target speed of the bucket 113 from the speed limit in the vertical direction of the end of the work implement 110. The work implement controller 213 calculates the speed limit of the boom 111 from the speed limit in the vertical direction of the boom 111.

The control command output unit 214 outputs a control command for the boom 111, a control command for the arm 112, and a control command for the bucket 113 generated by the work implement controller 213 to the electromagnetic proportional control valve of the hydraulic device 125.

<<Display Control Device>>

The display control device 127 includes a processor 1271, a main memory 1272, a storage 1273, and an interface 1274.

A program for controlling display of the input/output device 128 is stored in the storage 1273. Examples of the storage 1273 include an HDD and a nonvolatile memory. The storage 1273 may be an internal medium that is directly connected to a bus of the display control device 127 or may be an external medium that is connected to the display control device 127 via the interface 1274 or a communication line.

The processor 1271 reads the program from the storage 1273, loads the program into the main memory 1272, and performs processing according to the program. Further, the processor 1271 reserves a storage area in the main memory 1272 according to the program. The interface 1274 is connected to the work implement control device 126 and the input/output device 128, and exchanges signals with the same.

The program may be one for realizing some of the functions which the display control device 127 is caused to perform. For example, the program may also be one causing the display control device 127 to perform the functions in combination with another program already stored in the storage 1273 or in combination with another program implemented in another device.

Figure 5:
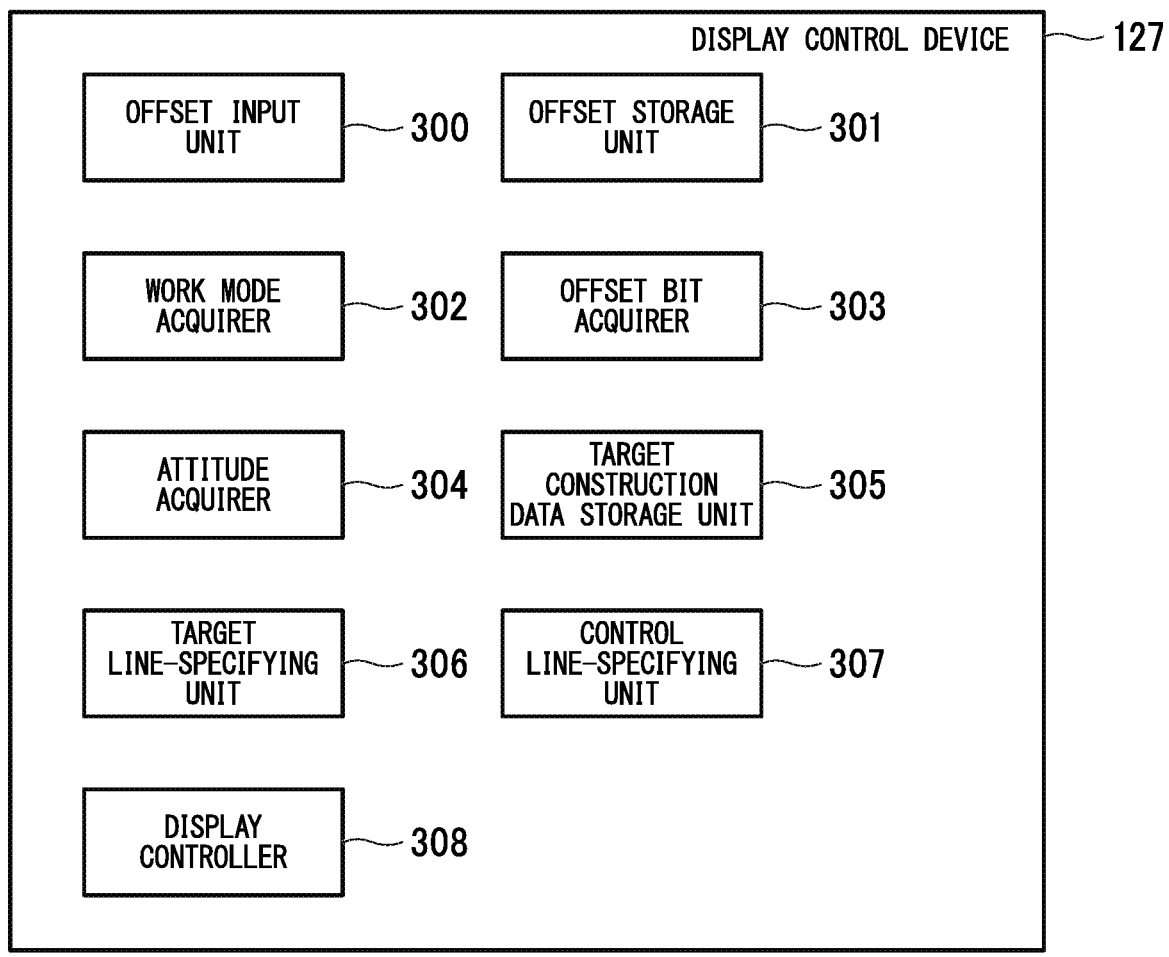
FIG. 5 is a block diagram showing a configuration of a display control device according to the first embodiment.

FIG. 5 is a block diagram showing a configuration of the display control device according to the first embodiment.

The display control device 127 includes an offset input unit 300, an offset storage unit 301, a work mode acquirer 302, an offset bit acquirer 303, an attitude acquirer 304, a target construction data storage unit 305, a target line-specifying unit 306, a control line-specifying unit 307, and a display controller 308.

The offset input unit 300 receives an input of the offset distance of the control line to the target surface from the operator of the hydraulic excavator 100 via the input/output device 128. The offset input unit 300 outputs the input offset distance to the work implement controller 126.

The offset storage unit 301 stores the offset distance input to the offset input unit 300.

The work mode acquirer 302 acquires the work mode of the work implement 110 from the work implement control device 126.

The offset bit acquirer 303 acquires an offset bit indicating whether or not to display the control line from the work implement control device 126.

The attitude acquirer 304 acquires the position of the cutting edge E of the work implement 110 in the site coordinate system and the inclination of the bucket bottom surface 113A in the site coordinate system from the work implement control device 126.

The target construction data storage unit 305 stores target construction data representing a target shape of the object to be excavated at the construction site. The target construction data is stored in the target construction data storage unit 305 through reading thereof from an external storage medium or through receiving thereof from an external server via a network. The target construction data stored in the target construction data storage unit 305 is the same as that stored in the target construction data storage unit 205.

The target line-specifying unit 306 specifies a target line to be displayed on the screen of the input/output device 128 on the basis of the target construction data stored in the target construction data storage unit 305 and the position of the cutting edge E of the bucket 113 acquired by the attitude acquirer 304. The target line is represented by the intersection line between a driving surface of the work implement 110 (a surface orthogonal to the Ym axis passing through the bucket 113) and the target construction data. The target line-specifying unit 306 specifies the target line through the following procedure. From the target construction data, the target line-specifying unit 306 specifies a surface positioned vertically below the cutting edge E of the bucket 113 or a surface closest to the cutting edge E as a target surface. Then, the target line-specifying unit 306 specifies the intersection line between the driving surface of the work implement 110 and the target construction data, which passes through the target surface, as a target line.

On the basis of the offset distance stored in the offset storage unit 301 and the offset bit acquired by the offset bit acquirer 303, the control line-specifying unit 307 determines both the presence or absence of display of a control line on the screen of the input/output device 128 and the position of the display. The control line-specifying unit 307 determines to display the control line when the offset bit indicates 1. At this time, the control line-specifying unit 307 sets the control line at a position shifted by a distance corresponding to the offset distance stored in the offset storage unit 301 in the upward direction (+Zg direction) from the target line specified by the target line-specifying unit 306. Further, when the offset bit indicates 0, the control line-specifying unit 307 determines that the display form of the control line is a non-display form. The offset bit indicates 0 when the work mode is the rolling mode. Therefore, determination of the control line-specifying unit 307 as to whether the offset bit indicates 1 or 0 is an example of determining whether or not the work of the work implement 110 is a predetermined work. It is not to be noted that, when the offset distance is 0, the display form of the control line is a non-display form, regardless of the value of the offset bit (regardless of the angle θ formed between the bucket bottom surface 113A and the target surface).

The display controller 308 generates a display signal indicating a screen to be displayed on the input/output device 128 on the basis of the work mode acquired by the work mode acquirer 302, the information acquired by the attitude acquirer 304, the target construction data stored in the target construction data storage unit 305, the target line specified by the target line-specifying unit 306, and the presence or absence of display of the control line determined by the control line-specifying unit 307. When the offset bit is 1, the display controller 308 generates a display signal for displaying the target line, the control line, and the position of the bucket 113. When the offset bit is 0, the display controller 308 generates a display signal for displaying the target line and the position of the bucket 113. That is, when the offset bit is 0, the display controller 308 makes the control line not be displayed. It is to be noted that, in another embodiment, when the offset bit is 0, the display controller 308 may display the control line at the same position as the target line. Displaying the control line at the same position as the target line is an example of making the control line not be displayed. Examples of making the control line not be displayed include erasure of the control line, making the color of the control line the same as background color, and switching of the line type of the control line to a line type indicating that there is no control line at the position of the control line (for example, a dashed-dotted line).

Figure 6:
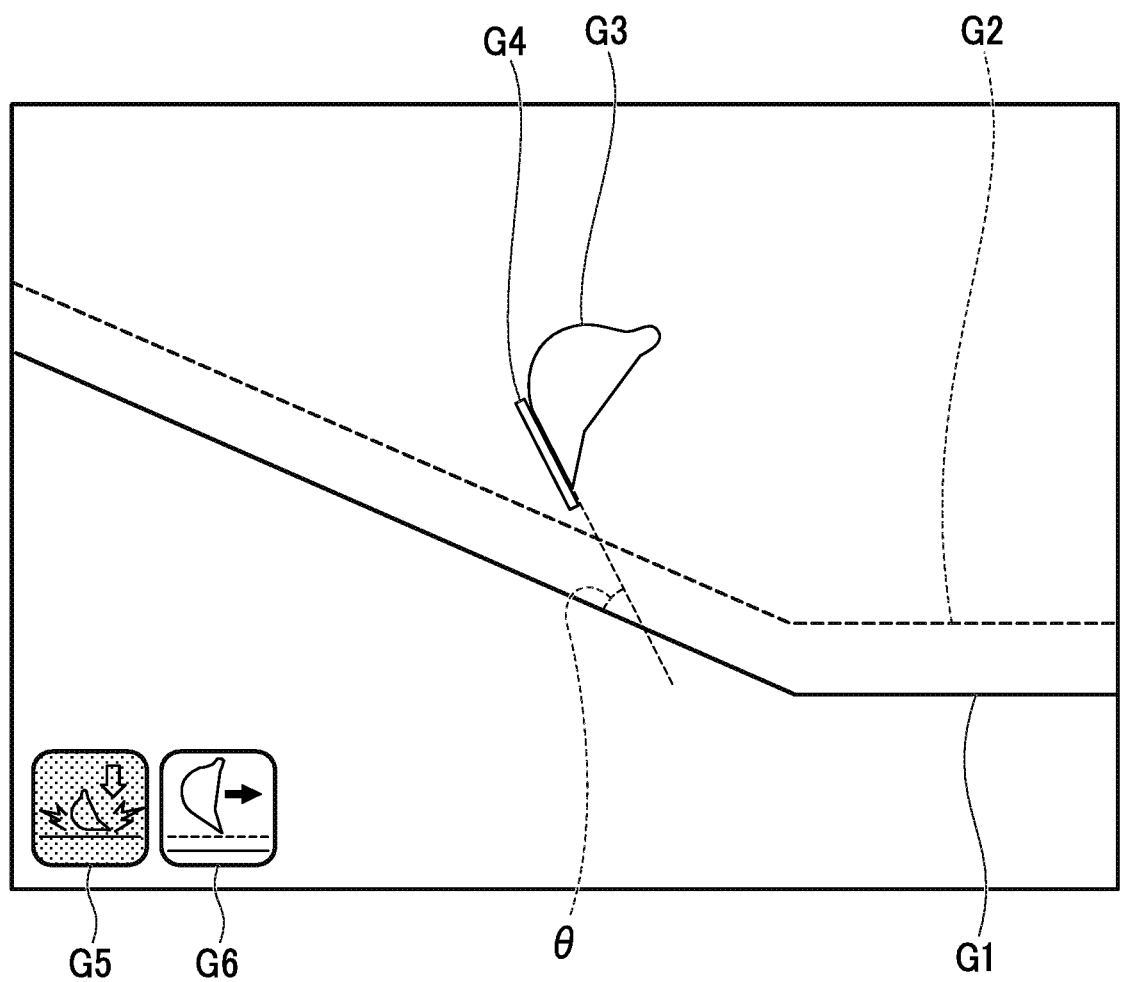
FIG. 6 is an example of a screen displayed on an input/output device when the work mode is an excavation mode.

FIG. 6 shows an example of a screen displayed on the input/output device when the work mode is the excavation mode.

When the work mode is the excavation mode (when the offset bit is 1), the display controller 308 generates a display signal for displaying the target line, the control line, and the position of the bucket 113 to display an image as shown in FIG. 6 on the input/output device 128. That is, a screen including a target line G1, a control line G2, an illustration G3 of the bucket 113, a line segment G4 representing the bucket bottom surface 113A, a rolling icon G5 indicating whether or not the work mode is the rolling mode, and an offset icon G6 indicating whether the offset function is set or unset and whether or not the offset function is enabled when it is set is displayed on the input/output device 128. "The offset function is set" refers to a state in which the work implement control device 126 determines whether to enable or disable the offset function on the basis of the offset bit. "The offset function is unset" refers to a state in which the work implement control device 126 disables the offset function, regardless of the work mode. "The offset function is enabled" refers to a state in which, with the offset function set, the work implement control device 126 sets the control surface at a position spaced apart from the target surface by a predetermined offset distance on the basis of the work mode. "The offset function is disabled" refers to a state in which, with the offset function set, the work implement control device 126 sets the control surface at the same position as the target surface on the basis of the work mode. At this time, the target line G1 and the control line G2 are displayed in different forms. For example, the target line G1 is displayed as a solid line and the control line G2 is displayed as a dashed line. The position of the illustration G3 is determined on the basis of the position of the cutting edge E acquired by the attitude acquirer 304 and the inclination of the illustration G3 is determined on the basis of the inclination of the bucket bottom surface 113A acquired by the attitude acquirer 304. Further, the rolling icon G5 is displayed in a form indicating that the work mode is not the rolling mode. Further, the offset icon G6 is displayed in a form indicating that the offset function for the control line is set and enabled. In FIG. 6, the angle formed between the bucket bottom surface 113A and the target surface is described as θ. However, the angle θ may or may not be displayed on the screen displayed on the input/output device.

Figure 7:
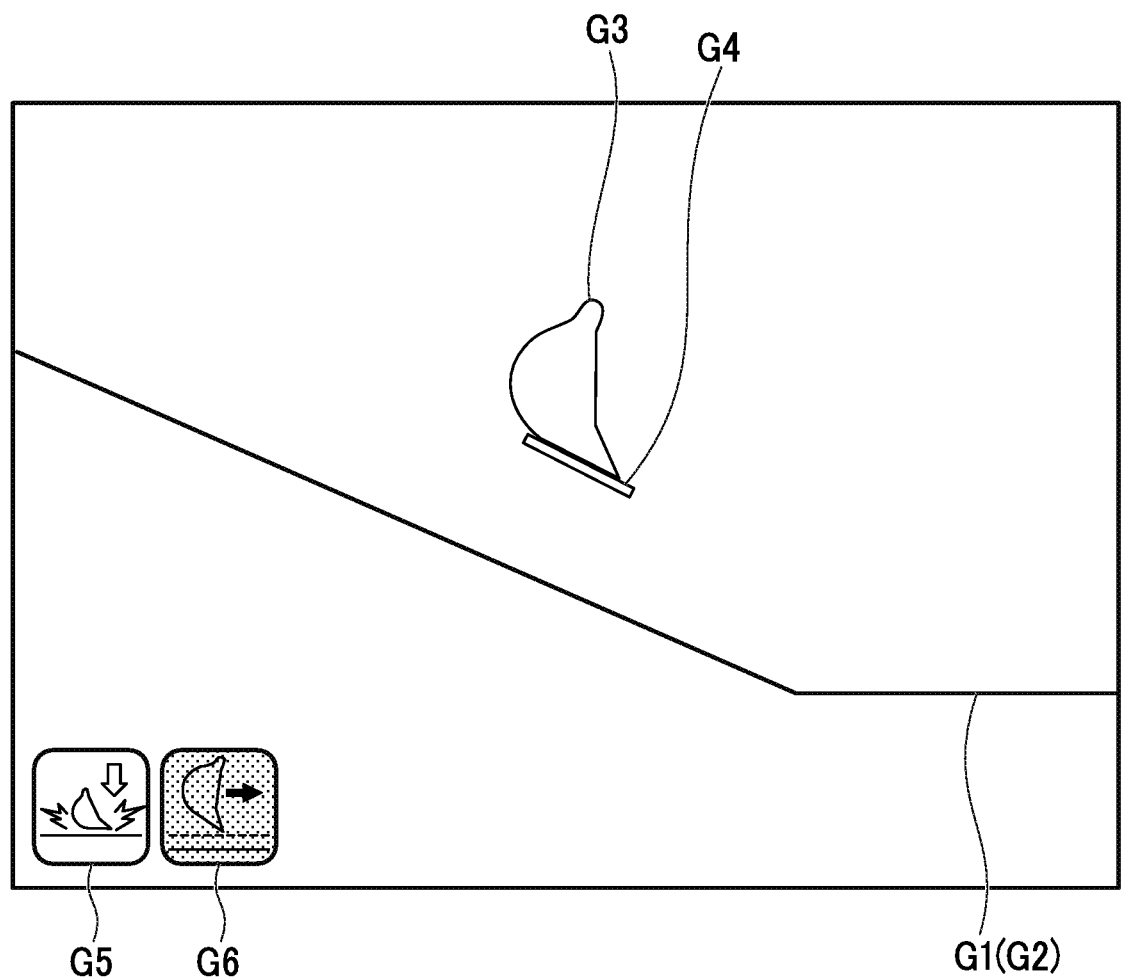
FIG. 7 is an example of a screen displayed on the input/output device when the work mode is a rolling mode.

FIG. 7 shows an example of a screen displayed on the input/output device when the work mode is the rolling mode.

When the work mode is the rolling mode (when the offset bit is 0), the display controller 308 generates a display signal for displaying the target line and the position of the bucket 113 to display an image as shown in FIG. 7 on the input/output device 128. That is, a screen including a target line G1, an illustration G3 of the bucket 113, a line segment G4 representing the bucket bottom surface 113A, a rolling icon G5, and an offset icon G6 and not including a control line G2 is displayed on the input/output device 128. At this time, the rolling icon G5 is displayed in a form indicating that the work mode is the rolling mode. Although the offset function for the control line is set, the offset icon G6 is displayed in a form indicating that the offset function is disabled.

That is, the display unit 1281 of the input/output device 128 displays at least one of the target line and the control line in a different form depending on whether or not the work state of the hydraulic excavator 100 is in the rolling mode. It is to be noted that, when the work mode is the rolling mode, the display controller 308 may also generate a display signal for displaying the control line G2 and the position of the bucket 113 to cause the input/output device 128 to display an image with the control line G2 displayed at the position of the target line G1 in FIG. 7.

<<Operation of Work Implement Control Device>>

Here, the outline of the operation of the work implement control device 126 of the hydraulic excavator 100 according to the first embodiment will be described. First, the work implement control device 126 of the hydraulic excavator 100 specifies the intersection line between the driving surface of the work implement 110 and the target surface as a target line. The work implement control device 126 sets a control line at the position of the target line. When an offset distance is set by the operator or the like, the work implement control device 126 sets the control line at a position spaced apart from the position of the target line by the offset distance. Upon determining that the offset function is disabled on the basis of the determination of the work mode or the like, the work implement control device 126 sets the position of the control line at the position of the target line, regardless of the setting of the offset distance by the operator.

A control method for the hydraulic excavator 100 according to the first embodiment will now be described.

Before control of the hydraulic excavator 100 shown below, the operator of the hydraulic excavator 100 inputs the offset distance of the control line to the target surface to the display control device 127 via the input/output device 128. The offset input unit 300 of the display control device 127 causes the offset storage unit 301 to store the input offset distance and outputs the offset distance to the work implement control device 126. The offset acquirer 207 of the work implement control device 126 acquires the offset distance from the display control device 127 and causes the offset storage unit 208 to store the acquired offset distance. Thereafter, when the operator inputs an offset distance, the work implement control device 126 updates the offset distance stored in the offset storage unit 208 and the display control device 127 updates the offset distance stored in the offset storage unit 301.

Figure 8:
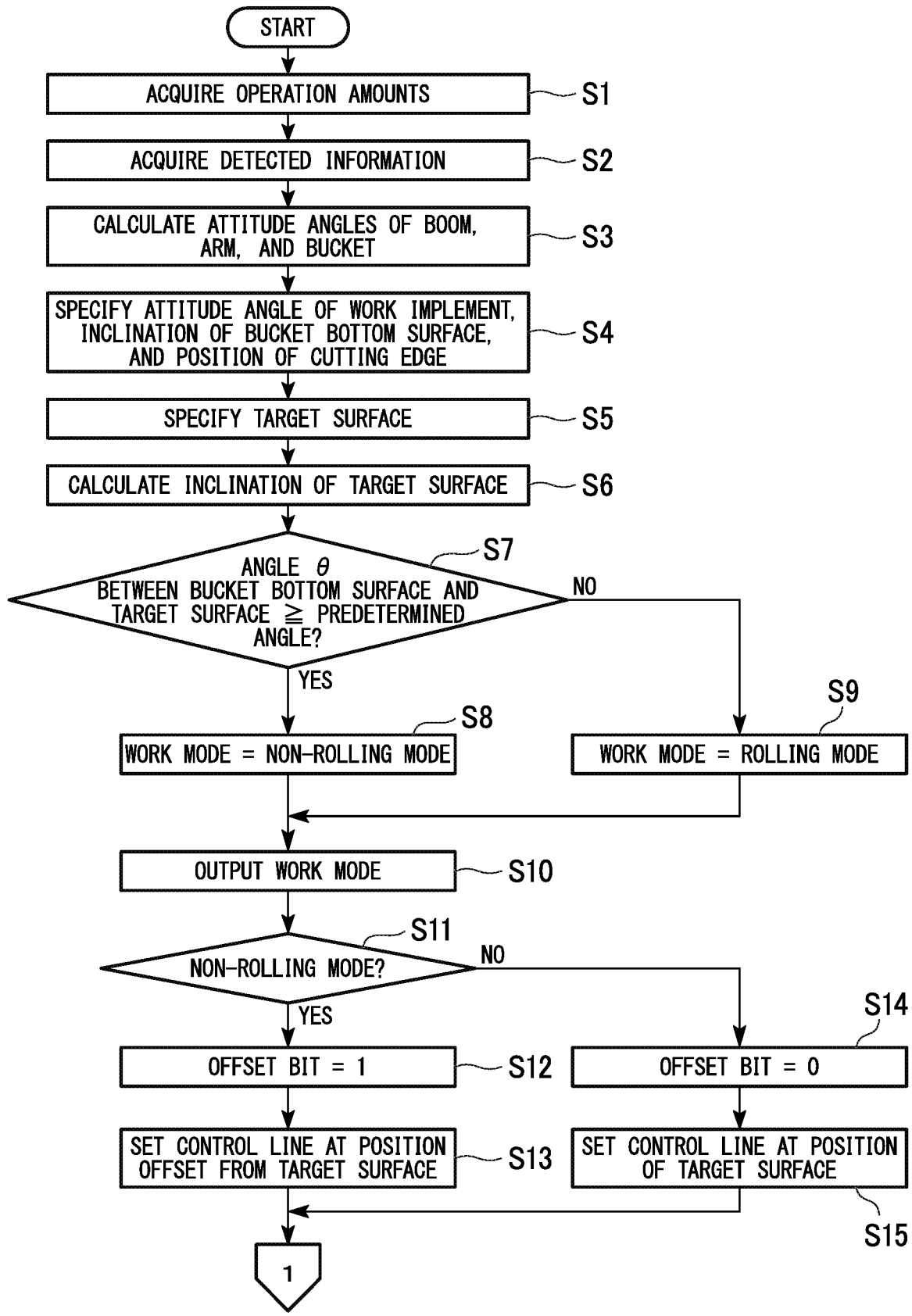
FIG. 8 is a flowchart showing the operation of the work implement control device according to the first embodiment.
Figure 9:
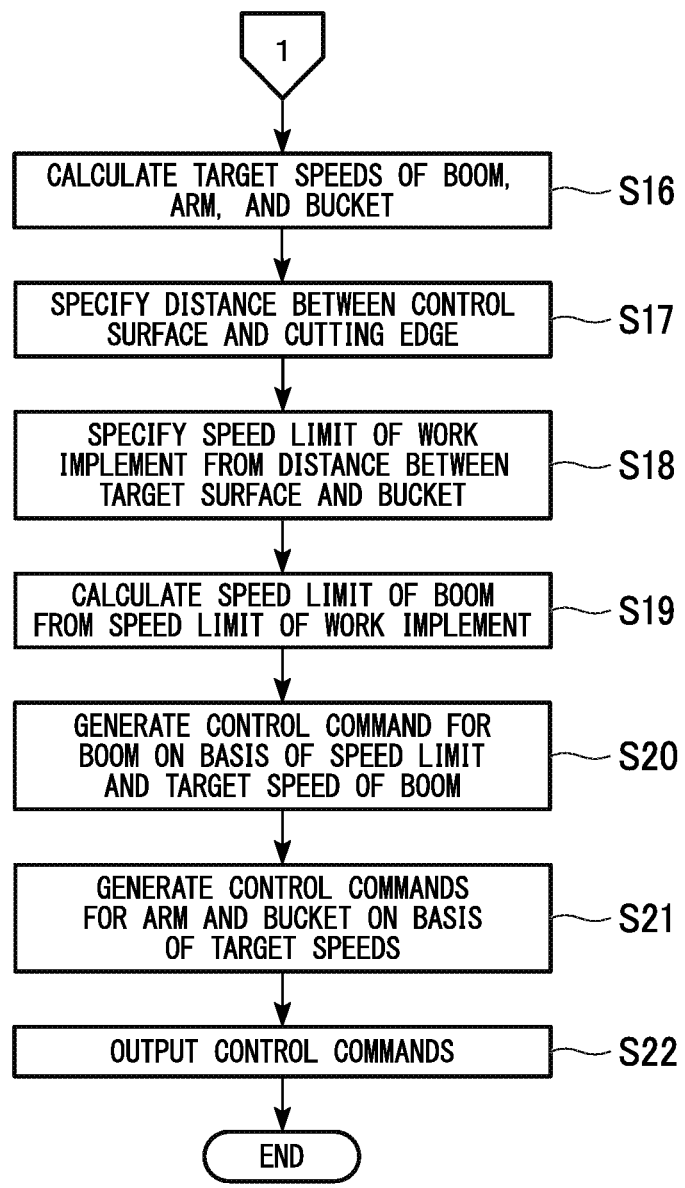
FIG. 9 is a flowchart showing the operation of the work implement control device according to the first embodiment.

FIGS. 8 and 9 are flowcharts showing the operation of the work implement control device according to the first embodiment. The work implement control device 126 performs the control shown below at intervals of a predetermined control period.

The operation amount acquirer 201 acquires an operation amount relating to the boom 111, an operation amount relating to the arm 112, an operation amount relating to the bucket 113, and an operation amount relating to turning from the operation device 1211, and causes the operation amount storage unit 202 to store the acquired operation amounts (step S1). The detection information acquirer 203 acquires information detected by each of the position/orientation calculator 123, the tilt detector 124, and the stroke detector 117 (step S2).

The attitude-specifying unit 204 calculates an attitude angle α of the boom 111, an attitude angle β of the arm 112, and an attitude angle γ of the bucket 113 from the respective stroke lengths of the hydraulic cylinders (step S3). The attitude-specifying unit 204 calculates an attitude angle η of the end of the work implement 110, the inclination of the bucket bottom surface 113A in the site coordinate system, and the position of the cutting edge E on the basis of the calculated attitude angles α, β and γ, the dimension L1 of the boom 111, the dimension L2 of the arm 112, the dimension L3 of the bucket 113, and the shape of the bucket 113 stored in the work machine information storage unit 200, and the position, orientation and attitude of the turning body 120 acquired by the detection information acquirer 203 (step S4).

From the target construction data stored in the target construction data storage unit 205, the target surface-specifying unit 206 specifies a surface positioned vertically below the cutting edge E or a surface closest to the cutting edge E as a target surface (step S5). The target surface-specifying unit 206 calculates the inclination in the site coordinate system of the specified target surface (step S6).

Next, the work mode determinator 209 determines whether or not the angle formed between the bucket bottom surface 113A and the target surface is equal to or greater than a predetermined angle (step S7). When the angle formed between the bucket bottom surface 113A and the target surface is equal to or greater than the predetermined angle (step S7: YES), the work mode determinator 209 determines that the work mode is the non-rolling mode (step S8). On the other hand, when the angle formed between the bucket bottom surface 113A and the target surface is less than the predetermined angle (step S7: NO), the work mode determinator 209 determines that the work mode is the rolling mode (step S9).

Upon determining the work mode in step S8 or S9, the work mode determinator 209 outputs the determined work mode to the display control device 127 (step S10).

The control line determinator 210 determines whether or not the work mode determined by the work mode determinator 209 is the non-rolling mode (step S11). When the work mode is the non-rolling mode (step S11: YES), the control line determinator 210 determines to display the control line on the input/output device 128 and sets the offset bit to 1 (step S12). Further, the control line determinator 210 sets the control line at a position to which the target surface specified by the target surface-specifying unit 206 is shifted upward by the offset distance stored in the offset storage unit 208 (step S13).

On the other hand, when the work mode is not the non-rolling mode (step S11: NO), the control line determinator 210 determines not to display the control line on the input/output device 128 and sets the offset bit to 0 (step S14). Further, the control line determinator 210 sets the control line at the position of the target surface specified by the target surface-specifying unit 206 (step S15).

When the control line determinator 210 has determined the control line in step S13 or S15, the target speed determinator 212 calculates target speeds of the boom 111, the arm 112, and the bucket 113 on the basis of the operation amounts acquired by the operation amount acquirer 201 in step S1 (step S16).

The distance-specifying unit 211 specifies the distance between the control line determined by the control line determinator 210 and the cutting edge E of the bucket 113 (step S17). Next, the work implement controller 213 specifies the speed limit of the end of the work implement 110 on the basis of the distance specified by the distance-specifying unit 211 (step S18). Next, the work implement controller 213 calculates the speed limit of the boom 111 on the basis of the target speeds of the arm 112 and the bucket 113 and the speed limit of the end of the work implement 110 (step S19). The work implement controller 213 generates a control command for the boom 111 on the basis of the speed limit of the boom 111 and the target speed of the boom 111 (step S20). For example, the work implement controller 213 generates a control command for the boom 111 on the basis of the speed limit of the boom 111 when the target speed of the boom 111 is greater than the speed limit of the boom 111 and generates a control command for the boom 111 on the basis of the target speed of the boom 111 when the target speed of the boom 111 is equal to or less than the speed limit of the boom 111. In addition, the work implement controller 213 generates a control command for the arm 112 on the basis of the target speed of the arm 112, and generates a control command for the bucket 113 on the basis of the target speed of the bucket 113 (step S21).

When the work implement controller 213 has generated the control commands for the boom 111, the arm 112, and the bucket 113, the control command output unit 214 outputs the control commands to the electromagnetic proportional control valve of the hydraulic device 125 (step S22). Thereby, the hydraulic device 125 drives the boom cylinder 114, the arm cylinder 115, and the bucket cylinder 116.

Figure 10:
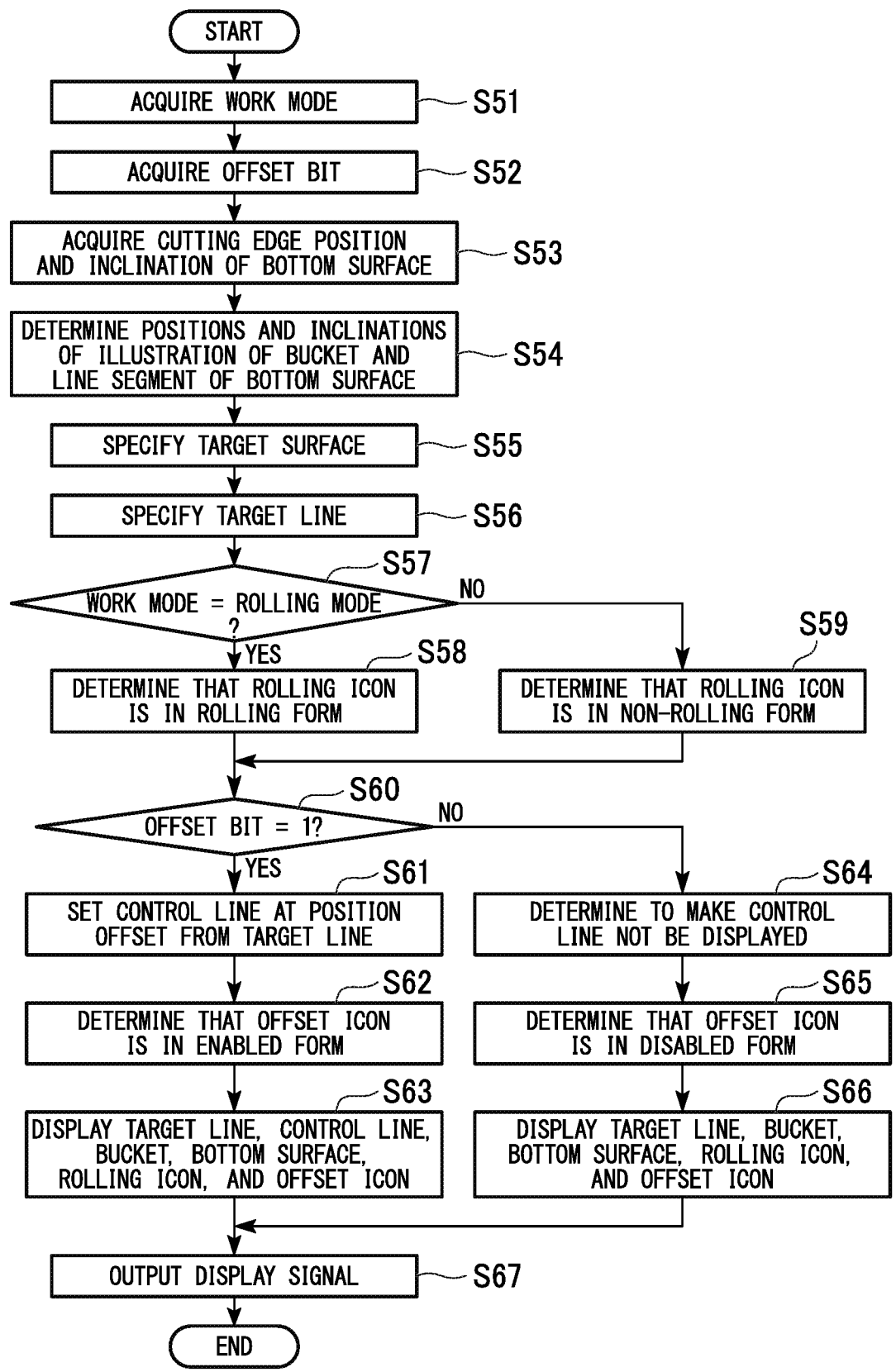
FIG. 10 is a flowchart showing the operation of the display control device according to the first embodiment.

FIG. 10 is a flowchart showing the operation of the display control device according to the first embodiment.

When the operation of steps S1 to S22 described above has been performed, the work implement control device 126 outputs the work mode of the work implement 110, the offset bit, the position in the site coordinate system of the cutting edge E of the work implement 110, and the inclination in the site coordinate system of the bucket bottom surface 113A to the display control device 127.

The work mode acquirer 302 of the display control device 127 acquires the work mode of the work implement 110 from the work implement control device 126 (step S51). The offset bit acquirer 303 acquires an offset bit from the work implement control device 126 (step S52). In addition, the attitude acquirer 304 acquires the position in the site coordinate system of the cutting edge E of the work implement 110 and the inclination in the site coordinate system of the bucket bottom surface 113A from the work implement control device 126 (step S53).

Next, on the basis of the position of the cutting edge E and the inclination of the bucket bottom surface 113A acquired by the attitude acquirer 304, the display controller 308 determines the position and inclination of the illustration G3 of the bucket 113 and the position and inclination of the line segment G4 representing the bucket bottom surface 113A (step S54).

Next, from the target construction data stored in the target construction data storage unit 305, the target line-specifying unit 306 specifies a surface positioned vertically below the cutting edge E of the bucket 113 acquired by the attitude acquirer 304 or a surface closest to the cutting edge E as a target surface (step S55). The target line-specifying unit 306 specifies the intersection line between the driving surface of the work implement 110 and the target construction data, which passes through the target surface, as a target line G1 (step S56).

Next, the display controller 308 determines whether or not the work mode acquired by the work mode acquirer 302 is the rolling mode (step S57). When the work mode is the rolling mode (step S57: YES), the display controller 308 determines to display the rolling icon G5 in a form indicating that the work mode is the rolling mode (step S58). On the other hand, when the work mode is not the rolling mode (step S57: NO), the display controller 308 determines to display the rolling icon G5 in a form indicating that the work mode is not the rolling mode (step S59).

When the display controller 308 has determined the form of the rolling icon G5, the control line-specifying unit 307 determines whether or not the offset bit acquired by the offset bit acquirer 303 indicates 1 (step S60). When the offset bit indicates 1 (step S60: YES), the control line-specifying unit 307 sets the control line G2 at a position shifted upward from the target line G1 specified by the target line-specifying unit 306 by the distance corresponding to the offset distance stored in the offset storage unit 301 (step S61). Next, the display controller 308 determines to display the offset icon G6 in a form indicating that the offset function is enabled (step S62). Then, the display controller 308 generates a display signal (first display signal) for displaying the target line G1, the control line G2, the illustration G3 of the bucket 113, the line segment G4 representing the bucket bottom surface 113A, the rolling icon G5, and the offset icon G6 (step S63).

On the other hand, when the offset bit indicates 0 (step S60: NO), the control line-specifying unit 307 determines to make the control line G2 not be displayed (step S64). Next, the display controller 308 determines to display the offset icon G6 in a form indicating that the offset function is disabled (step S65). Then, the display controller 308 generates a display signal (second display signal) for displaying the target line G1, the illustration G3 of the bucket 113, the line segment G4 representing the bucket bottom surface 113A, the rolling icon G5, and the offset icon G6 (step S66).

Upon generating the display signal in step S63 or S66, the display controller 308 outputs the display signal to the input/output device 128 (step S67). Thereby, the screen as shown in FIG. 6 or FIG. 7 is displayed on the input/output device 128.

<<Functions/Effects>>

As described above, upon determining that the work performed by the work implement 110 is not a rolling work, the work implement control device 126 according to the first embodiment controls the bucket 113 such that the bucket 113 does not enter a control line indicating a line which is at a different position from that of the target surface of the construction object and which the bucket 113 is to be prevented from entering. On the other hand, upon determining that the work is a rolling work, the work implement control device 126 controls the bucket 113 such that the bucket 113 does not enter the target surface.

Thereby, when shifting from the excavation work to the rolling work, the work implement control device 126 automatically disables the offset function for the control line without the operator manually bringing the offset function for the control line into an unset state. Thus, according to the first embodiment, the work implement control device 126 can save the labor of operation of the operator.

In addition, the display control device 127 according to the first embodiment determines whether or not the work performed by the work implement 110 is a rolling work and generates a first display signal for displaying a screen including at least the control line G2 indicating a line which is different from the target line of the construction object and which the bucket 113 is to be prevented from entering and the illustration G3 of the bucket 113 upon determining that the work is not a rolling work. On the other hand, the display control device 127 generates a second display signal for displaying the target line G1 and the illustration G3 of the bucket 113 upon determining that the work is a rolling work. Here, with the second display signal, a control line G2 indicating a different line from the target line is made not to be displayed.

Thereby, even if the work implement control device 126 temporarily disables the offset function for the control line, the display of the input/output device 128 is switched in accordance with the disabling. Therefore, even if the work implement control device 126 automatically switches the control line according to the work mode, it is possible to prevent the operator from being confused.

Further, the display control device 127 according to the first embodiment displays the offset icon G6 indicating whether or not the offset function for the control line is disabled. Thus, the operator can visually identify whether or not the offset function for the control line is disabled by checking the offset icon G6 in addition to the presence or absence of display of the control line G2.

Furthermore, the display control device 127 according to the first embodiment displays the rolling icon G5 indicating whether or not the work performed by the work implement 110 is a rolling work. Thereby, the operator can visually identify that the offset function is disabled for the rolling work.

Moreover, when the work mode is the excavation mode, the work implement control device 126 according to the first embodiment sets the control line at a position spaced upward apart from the target surface. This makes it easier to shape the soil leaving a rolling area for compacting the ground between the control line and the target surface through the rolling work of the work implement 110. Further, the work implement control device 126 according to the first embodiment determines that the work mode is the excavation mode when the angle θ formed between the bucket bottom surface 113A and the target surface is greater than a predetermined value. Thereby, the work implement control device 126 can specify the work mode without operation of the operator.

Furthermore, the work implement control device 126 according to the first embodiment sets the control line at the position of the target surface when the work mode is the rolling mode. Thereby, the work implement 110 can hit the ground at the position of the target surface at the time of compaction. In addition, when the angle θ formed between the bucket bottom surface 113A and the target surface is smaller than the predetermined value, the work implement control device 126 according to the first embodiment determines that the work mode is the rolling mode. Thereby, the work implement control device 126 can specify the work mode without operation of the operator.

Second Embodiment

Obstacles such as rocks protruding from the slope may be found during an excavation work of the work implement 110. When an obstacle protrudes, a work such as rolling cannot be performed, and therefore it is supposed that the obstacle will be pushed into the ground by the cutting edge E of the bucket 113 or the cutting edge E of the bucket 113 will dig under the slope to dig up the obstacle. In such a case, it is necessary to temporarily disable the offset function for the control line, regardless of the magnitude of the angle θ formed between the bucket bottom surface 113A and the target surface. In a second embodiment, a description will be given of a hydraulic excavator 100 that can switch the offset function between set and unset states manually according to the operator's decision in addition to the inclination of the bucket bottom surface 113A. The operator can manually set or unset the offset function. When the offset function is unset, the work implement control device 126 does not offset the control line. On the other hand, when the offset function is set, the work implement control device 126 determines whether to enable or disable the offset function on the basis of the angle θ formed between the bucket bottom surface 113A and the target surface as in the first embodiment. That is, when the offset function is set and it is determined that the offset function is enabled on the basis of the angle θ formed between the bucket bottom surface 113A and the target surface, the work implement control device 126 offsets the control line.

When the offset function is unset, the work implement control device 126 sets the control line at the position of the target surface as when the offset function is disabled. Therefore, when the offset function is unset, the display control device 127 makes the control line not be displayed as when the offset function is disabled.

<<Work Implement Control Device>>

Figure 11:
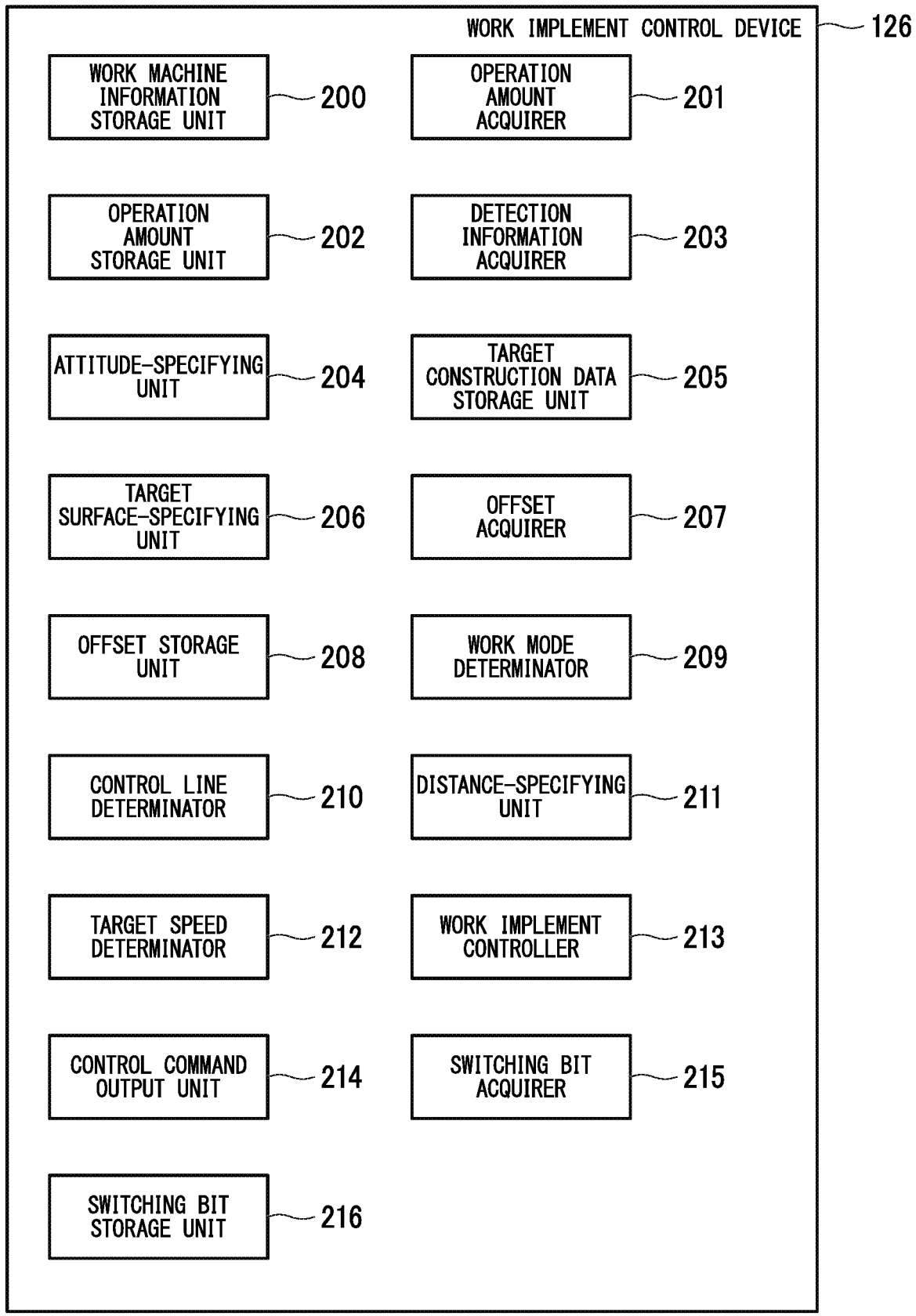
FIG. 11 is a block diagram showing a configuration of a work implement control device according to a second embodiment.

FIG. 11 is a block diagram showing a configuration of the work implement control device according to the second embodiment.

The work implement control device 126 according to the second embodiment includes a switching bit acquirer 215 and a switching bit storage unit 216 in addition to the components of the first embodiment. The switching bit acquirer 215 acquires an offset switching bit indicating whether to set or unset the offset function from the display control device 127. When the offset switching bit is 0, the offset function is unset. On the other hand, when the offset switching bit is 1, the offset function is set. The switching bit storage unit 216 stores the offset switching bit acquired by the switching bit acquirer 215. The switching bit acquirer 215 is an example of the setting information input unit.

<<Display Control Device>>

Figure 12:
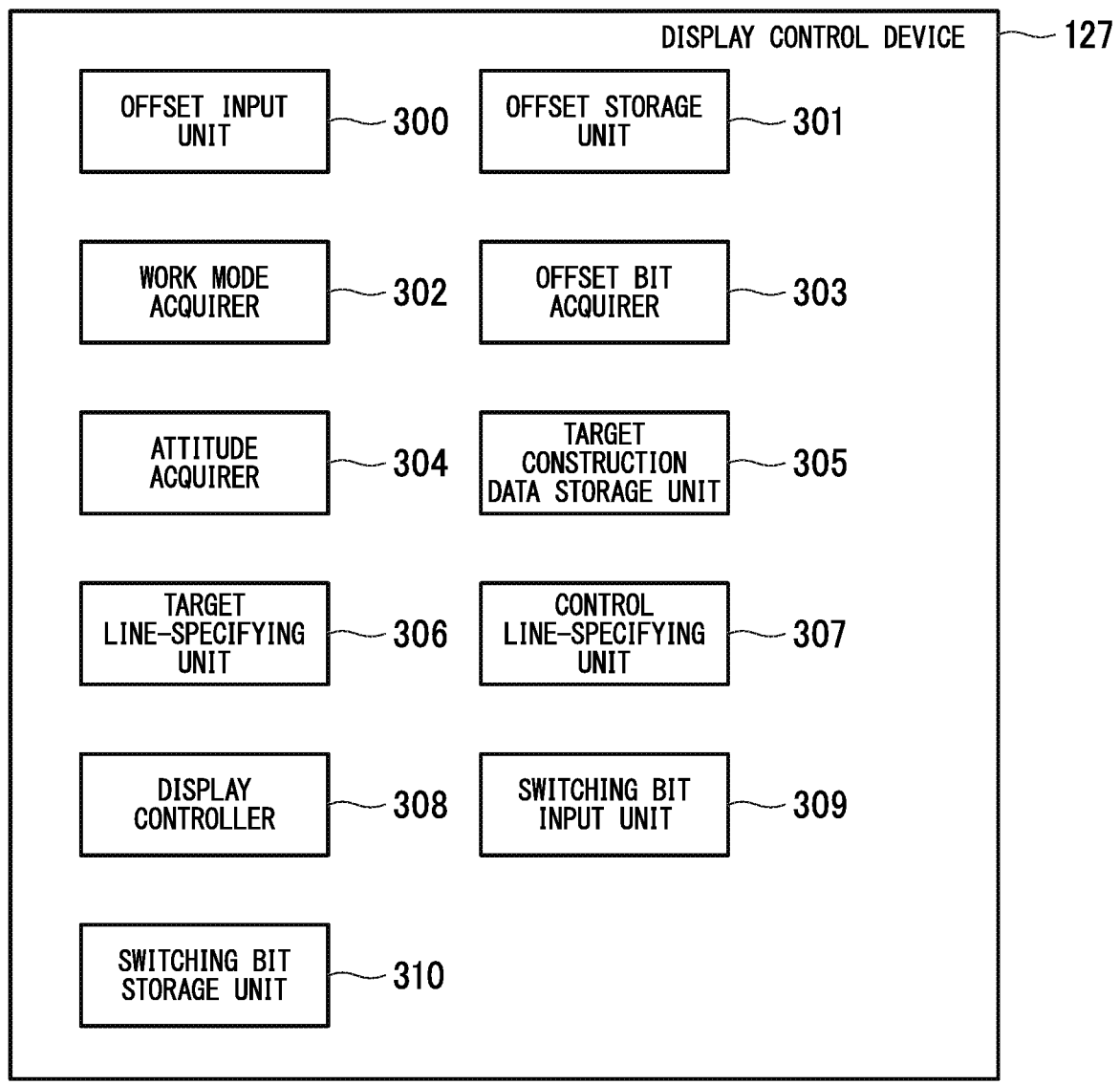
FIG. 12 is a block diagram showing a configuration of a display control device according to the second embodiment.

FIG. 12 is a block diagram showing a configuration of the display control device according to the second embodiment.

The display control device 127 according to the second embodiment includes a switching bit input unit 309 and a switching bit storage unit 310 in addition to the components according to the first embodiment. The switching bit input unit 309 receives an input of an offset switching bit indicating whether to set or unset the offset function from the operator via the input/output device 128. For example, when the operator presses an offset icon G6 displayed on the input/output device 128, the offset switching bit is switched. The switching bit input unit 309 outputs the offset switching bit to the work implement control device 126. The switching bit storage unit 310 stores the offset switching bit input to the switching bit input unit 309. It is to be noted that the offset switching bit is an example of the offset setting information indicating whether to set or unset the control line at a position offset from the position of the target surface.

Figure 13:
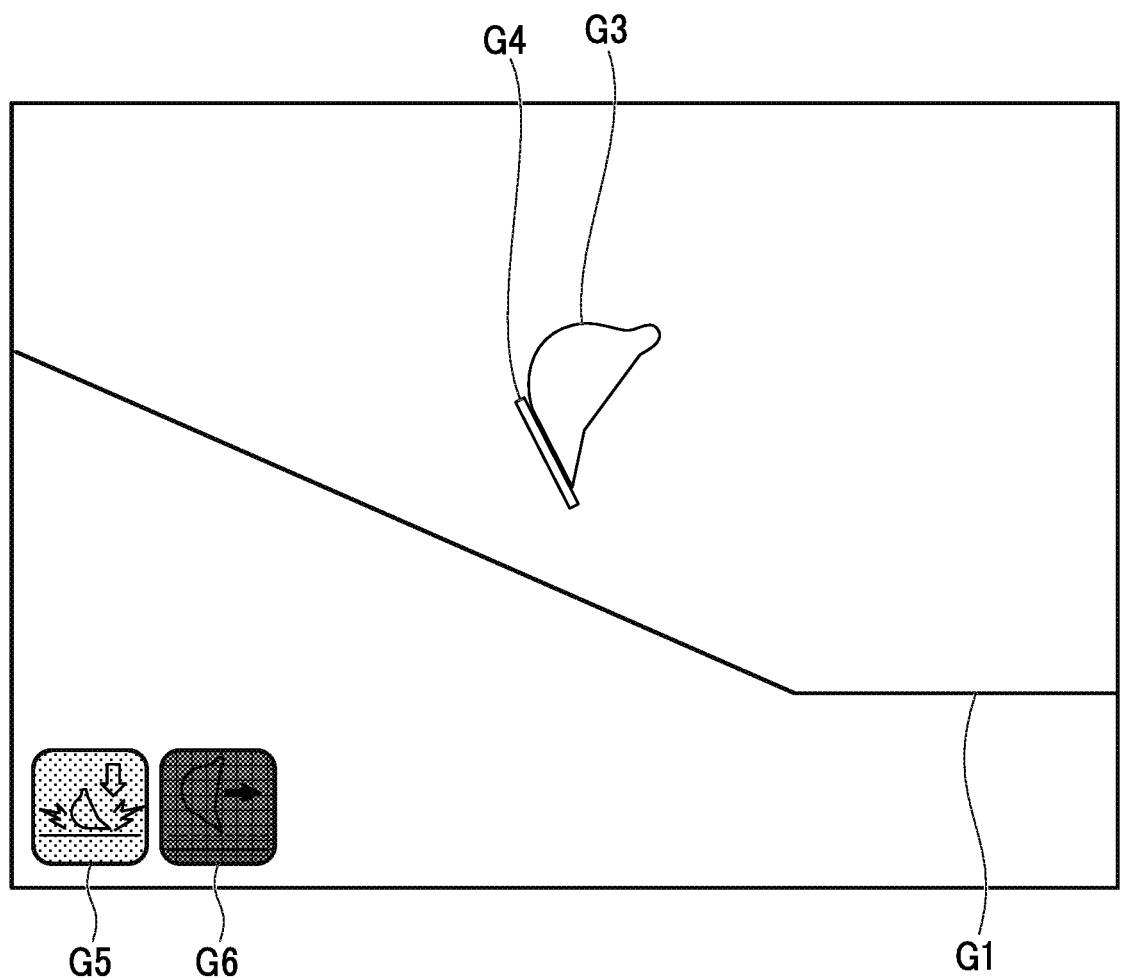
FIG. 13 is an example of a screen displayed on an input/output device in the second embodiment.

FIG. 13 is an example of a screen displayed on the input/output device according to the second embodiment.

When the offset switching bit stored in the switching bit storage unit 310 indicates 0, the offset icon G6 is displayed in a form indicating that the offset function is manually unset as shown in FIG. 13. That is, since the offset function is manually unset, the offset icon G6 is displayed in a different form from that of the offset icon G6 in FIG. 7 (the form indicating that the offset is disabled). At this time, when the operator presses the offset icon G6, the switching bit input unit 309 switches the offset switching bit to 1. In the example shown in FIG. 13, since the offset function is unset, the control line is set at the position of the target surface, regardless of whether or not the angle θ formed between the bucket bottom surface 113A and the target surface is equal to or greater than the predetermined angle.

On the other hand, when the offset switching bit stored in the switching bit storage unit 310 indicates 1, the offset icon G6 is displayed in a form indicating that the offset function is enabled or in a form indicating that the offset function is disabled as shown in FIG. 6 or FIG. 7. At this time, when the operator presses the offset icon G6, the switching bit input unit 309 switches the offset switching bit to 0.

<<Operation of Work Implement Control Device>>

Here, a control method for the hydraulic excavator 100 according to the second embodiment will be described.

Before the control of the hydraulic excavator 100 shown below, the operator of the hydraulic excavator 100 inputs the offset distance of the control line to the target surface to the display control device 127 via the input/output device 128. The offset input unit 300 of the display control device 127 causes the offset storage unit 301 to store the input offset distance and outputs the offset distance to the work implement control device 126. The offset acquirer 207 of the work implement control device 126 acquires the offset distance from the display control device 127 and causes the offset storage unit 208 to store the acquired offset distance.

Figure 14:
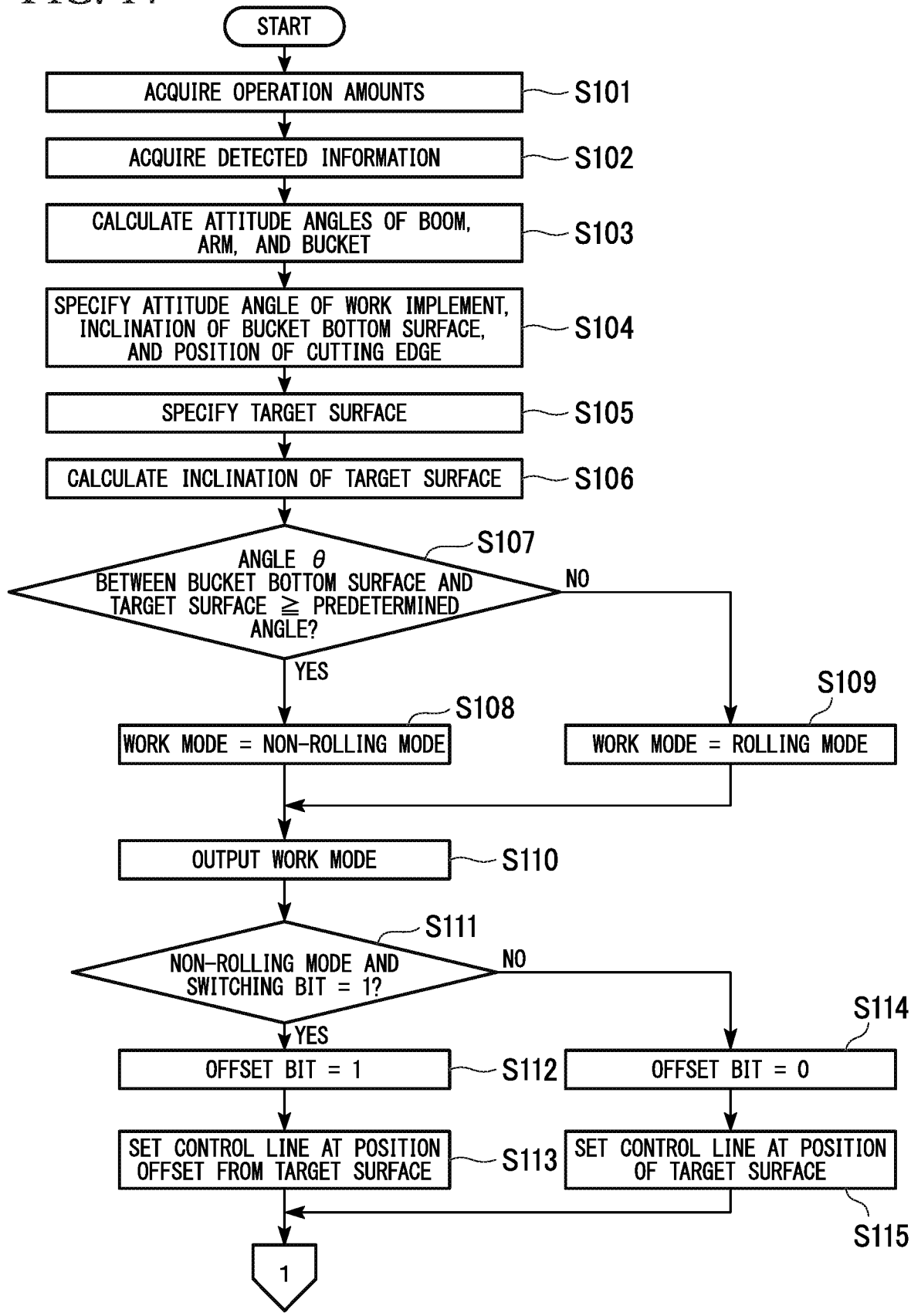
FIG. 14 is a flowchart showing the operation of the work implement control device according to the second embodiment.
Figure 15:
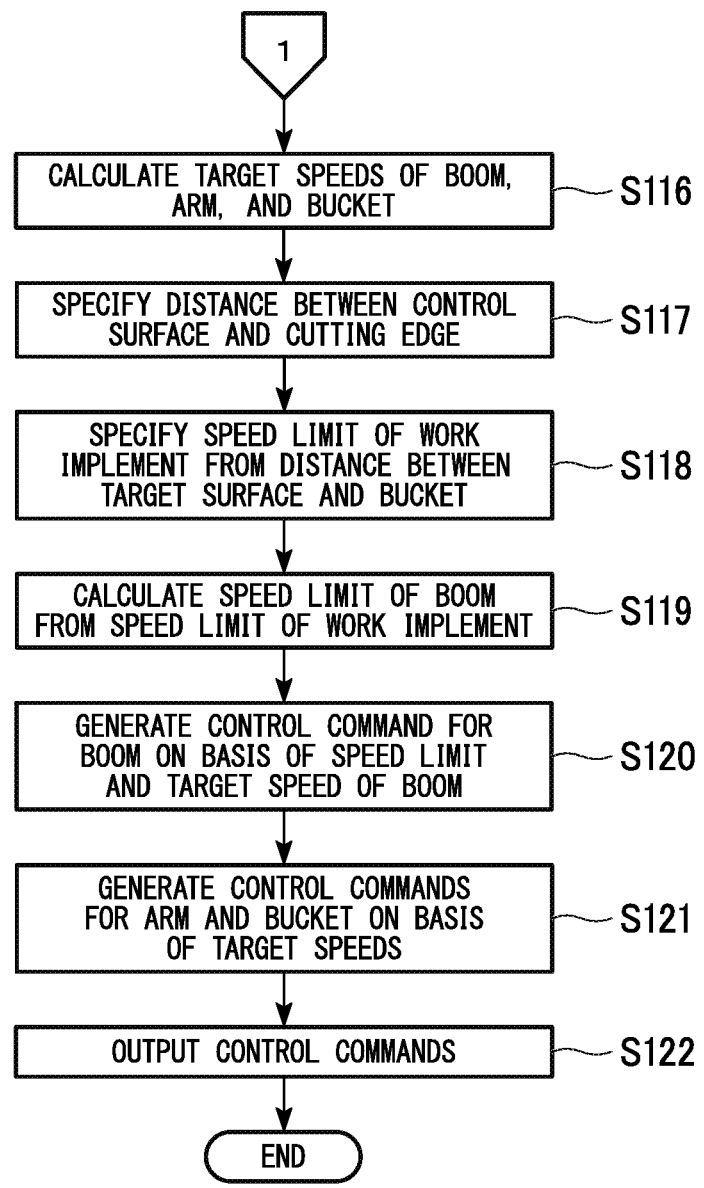
FIG. 15 is a flowchart showing the operation of the work implement control device according to the second embodiment.

FIGS. 14 and 15 are flowcharts showing the operation of the work implement control device according to the second embodiment. The work implement control device 126 performs the control shown below at intervals of a predetermined control period.

The processes of steps S101 to S110 in FIG. 14 are the same as the processes of steps S1 to S10 in FIG. 8, respectively.

When the work implement control device 126 has performed the process of step S110, the control line determinator 210 determines whether or not the work mode determined by the work mode determinator 209 is a non-rolling mode and the offset switching bit stored in the switching bit storage unit 216 is 1 (step S111). When the work mode is the non-rolling mode and the offset switching bit is 1 (step S111: YES), the control line determinator 210 determines to display the control line on the input/output device 128 and sets the offset bit to 1 (step S112). Further, the control line determinator 210 determines that the control line is at a surface obtained by shifting the target surface specified by the target surface-specifying unit 206 upward by the offset distance stored in the offset storage unit 208 (step S113).

On the other hand, when the work mode is not the non-rolling mode or when the offset switching bit is 0 (step S111: NO), the control line determinator 210 determines not to display the control line on the input/output device 128 and sets the offset bit to 0 (step S114). Further, the control line determinator 210 determines that the control line is at the target surface specified by the target surface-specifying unit 206 (step S115). Then, the work implement control device 126 performs the processes of steps S116 to S122. The processes of steps S116 to S122 in FIG. 15 are the same as the processes of steps S16 to S22 in FIG. 9, respectively.

Figure 16:
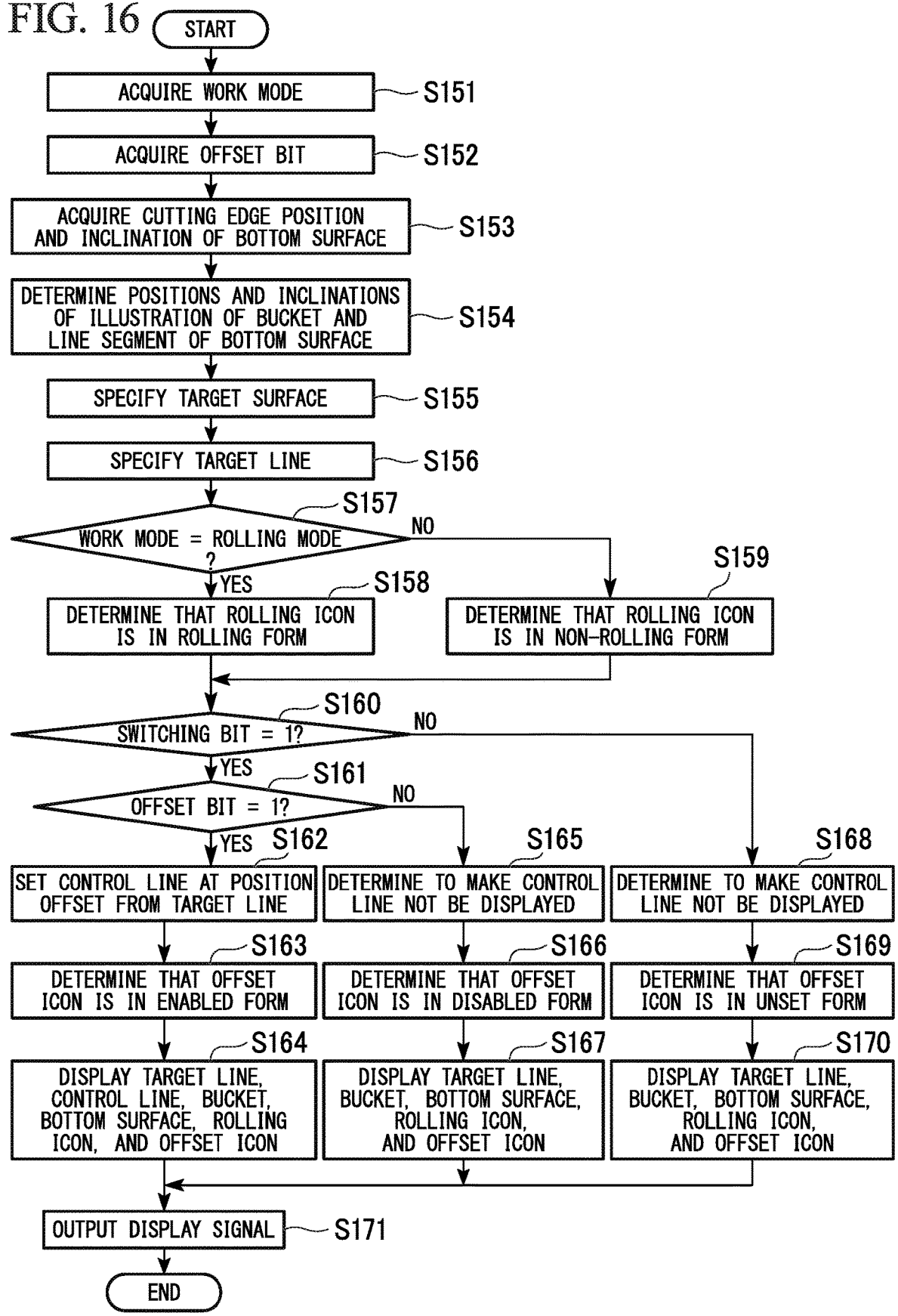
FIG. 16 is a flowchart showing the operation of the display control device according to the second embodiment.

FIG. 16 is a flowchart showing the operation of the display control device according to the second embodiment.

When the operation of steps S101 to S126 described above has been performed, the work implement control device 126 outputs the work mode of the work implement 110, the offset bit, the position in the site coordinate system of the cutting edge E of the work implement 110, and the inclination in the site coordinate system of the bucket bottom surface 113A to the display control device 127. The display control device 127 performs the control shown in FIG. 16.

The processes of steps S151 to S159 in FIG. 16 are the same as the processes of steps S51 to S159 in FIG. 10, respectively.

When the display controller 308 has determined the form of the rolling icon G5 in step S158 or S159, the control line-specifying unit 307 determines whether or not the offset switching bit stored in the switching bit storage unit 310 is 1 (step S160). When the offset switching bit is 1 (step S160: YES), the control line-specifying unit 307 determines whether or not the offset bit acquired by the offset bit acquirer 303 indicates 1 (step S161). When the offset bit indicates 1 (step S161: YES), the control line-specifying unit 307 sets the control line G2 at a position shifted upward from the target line G1 specified by the target line-specifying unit 306 by the distance corresponding to the offset distance stored in the offset storage unit 301 (step S162). Next, the display controller 308 determines to display the offset icon G6 in a form indicating that the offset function is enabled (step S163). Then, the display controller 308 generates a display signal (a first display signal) for displaying the target line G1, the control line G2, the illustration G3 of the bucket 113, the line segment G4 representing the bucket bottom surface 113A, the rolling icon G5, and the offset icon G6 (step S164).

On the other hand, when the offset bit indicates 0 (step S161: NO), the control line-specifying unit 307 determines to make the control line G2 not be displayed (step S165). Next, the display controller 308 determines to display the offset icon G6 in a form indicating that the offset function is disabled (step S166). Then, the display controller 308 generates a display signal (second display signal) for displaying the target line G1, the illustration G3 of the bucket 113, the line segment G4 representing the bucket bottom surface 113A, the rolling icon G5, and the offset icon G6 (step S167).

When the offset switching bit indicates 0 (step S160: NO), the control line-specifying unit 307 determines to make the control line G2 not be displayed (step S168). Next, the display controller 308 determines to display the offset icon G6 in a form indicating that the offset function is unset (step S169). Then, the display controller 308 generates a display signal (second display signal) for displaying the target line G1, the illustration G3 of the bucket 113, the line segment G4 representing the bucket bottom surface 113A, the rolling icon G5, and the offset icon G6 (step S170).

Upon generating the display signal in step S164, S167 or S170, the display controller 308 outputs the display signal to the input/output device 128 (step S171). Thereby, the screen as shown in FIG. 6, FIG. 7, or FIG. 13 is displayed on the input/output device 128.

<<Functions/Effects>>

As described above, according to the second embodiment, the work implement control device 126 and the display control device 127 switch the offset function between set and unset states on the basis of an input from the operator. Thereby, when the operator desires to temporarily disable the offset function according to their decision, such as when an obstacle is present on the slope, the operator can manually switch the offset function between set and unset states and can also visually identify its state.

Further, according to the second embodiment, the display control device 127 displays the offset icon G6 indicating whether or not the offset function for the control line is set or unset. Thus, the operator can visually identify whether or not the offset function for the control line is set or unset by checking the offset icon G6.

Other Embodiments

Although the embodiments have been described in detail with reference to the drawings, specific configurations thereof are not limited to those described above and various design changes or the like can be made.

For example, although the display control device 127 according to the above embodiments determines whether or not to display the control line on the basis of the offset bit, the present invention is not limited thereto. For example, the display control device 127 according to another embodiment may determine whether or not to display the control line on the basis of the work mode acquired from the work implement control device 126. Further, the display control device 127 according to another embodiment may acquire the inclination of the bucket bottom surface 113A from the work implement control device 126 and determine whether or not to display the control line on the basis of the difference between the inclination of the bucket bottom surface 113A and the inclination of the target surface, that is, the angle θ formed between the bucket bottom surface 113A and the target surface. In addition, the display control device 127 according to another embodiment may determine whether or not to display the control line on the basis of the angle formed between the bucket bottom surface 113A and the control line, the angle formed between the target line and the line segment G4 representing the bucket bottom surface 113A, or the angle formed between the control line and the line segment G4 representing the bucket bottom surface 113A. Here, any of determination as to whether the offset bit is 1 or 0, determination of the work mode acquired from the work implement control device 126, comparison between the inclination of the bucket bottom surface 113A and the inclination of the target surface, comparison between the inclination of the bucket bottom surface 113A and the inclination of the control line, comparison between the inclination of the line segment G4 representing the bucket bottom surface 113A and the inclination of the target line, or comparison between the inclination of the line segment G4 representing the bucket bottom surface 113A and the inclination of the control line is an example of determination as to whether or not the work performed by the work implement 110 is a predetermined work. It is to be noted that, in another embodiment, the display control device 127 may also determine whether or not to display the control line simply on the basis of the angle formed between the bucket bottom surface 113A and the target surface without determining whether or not the work is the predetermined work.

In the above embodiments, the work implement control device 126 uses the line segment G4 representing the bucket bottom surface 113A or the bucket bottom surface 113A to determine whether or not to display the control line, but the present invention is not limited thereto. For example, the work implement control device 126 may determine whether or not to display the control line using another surface or line indicating the inclination of the bucket 113 rather than using the bucket bottom surface 113A. That is, the work implement control device 126 may determine whether or not to display the control line on the basis of the angle formed between the bucket 113 and the target surface, the angle formed between the bucket 113 and the target line, or the angle formed between the bucket 113 and the control line.

Figure 17:
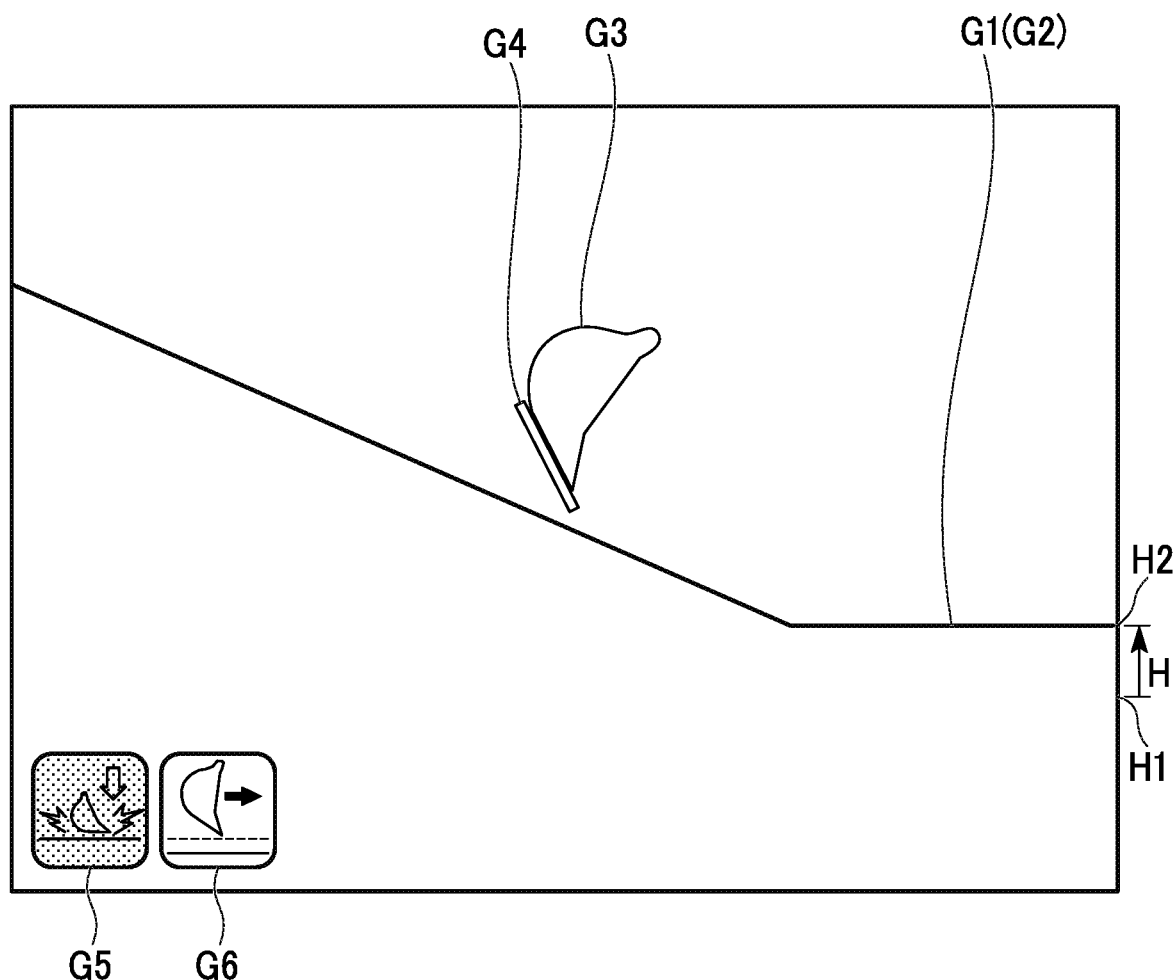
FIG. 17 is an example of a screen displayed on the input/output device according to another embodiment when the offset function is enabled.
Figure 18:
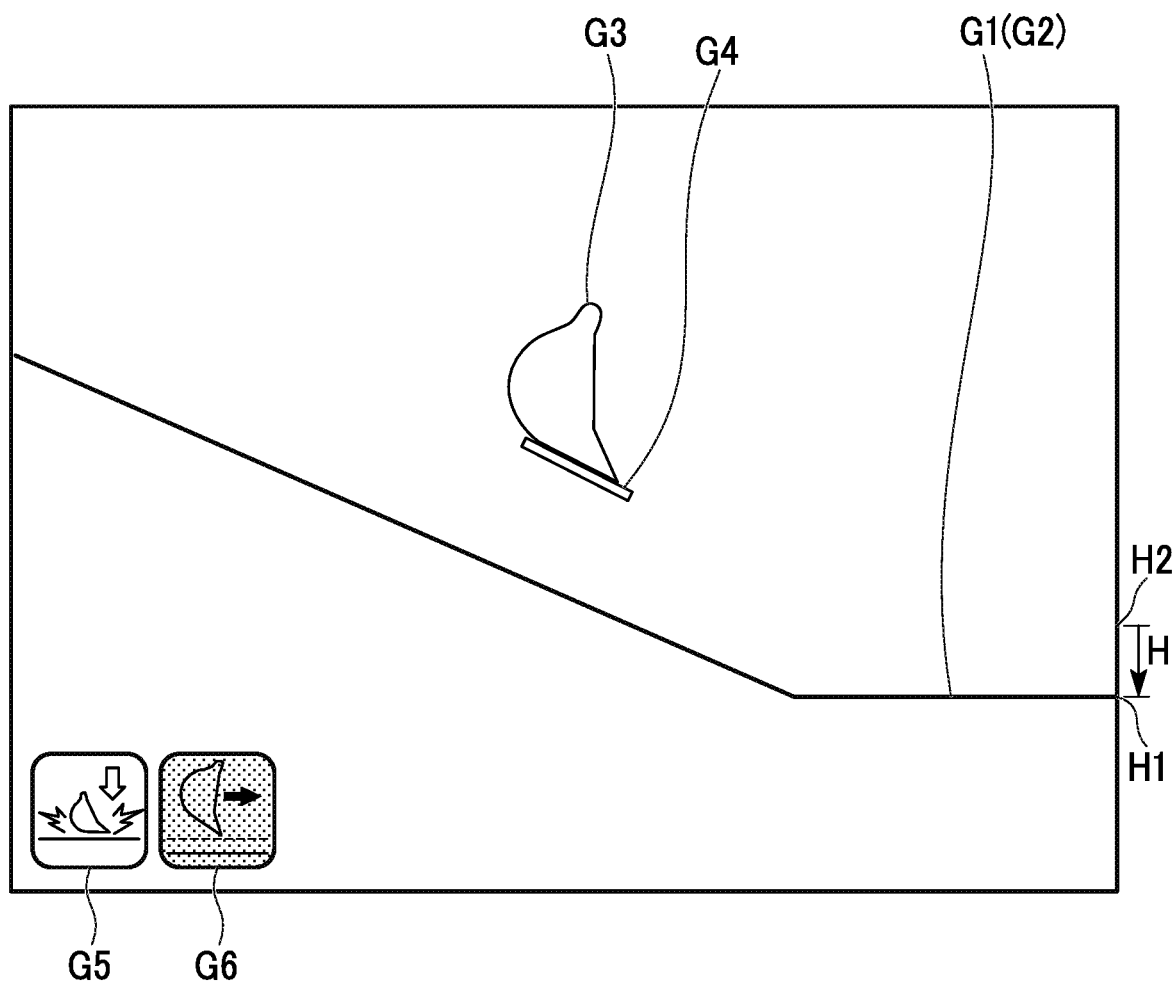
FIG. 18 is a first example of the screen displayed on the input/output device according to another embodiment when the offset function is disabled.

FIG. 17 is an example of a screen displayed on the input/output device according to another embodiment when the offset function is enabled. FIG. 18 is a first example of the screen displayed on the input/output device according to another embodiment when the offset function is disabled.

Although the display control device 127 according to the above embodiments has been described with reference to the case in which it switches the display of the target line and the control line, the present invention is not limited thereto. For example, the display control device 127 according to another embodiment may display the target line G1 without displaying the control line G2. In this case, the display control device 127 may display the target line G1 at a position H2 shifted upward from an original position H1 of the target line G1 by an offset height H as shown in FIG. 17 when the offset function is enabled and may return the position of the target line G1 to the original position H1 (that is, shift the position of the target line G1 merely downward by the offset height H) as shown in FIG. 18 when the offset function is disabled from that state. It is to be noted that the display control device 127 according to another embodiment may be configured to display the control line G2 instead of the target line G1 at the position of the target line G1 in FIG. 17 such that, when the offset function is disabled, it displays the control line G2 instead of the target line G1 at the position of the target line G1 in FIG. 18, thus changing the position of display of the control line G2, in the same manner as described above.

Figure 19:
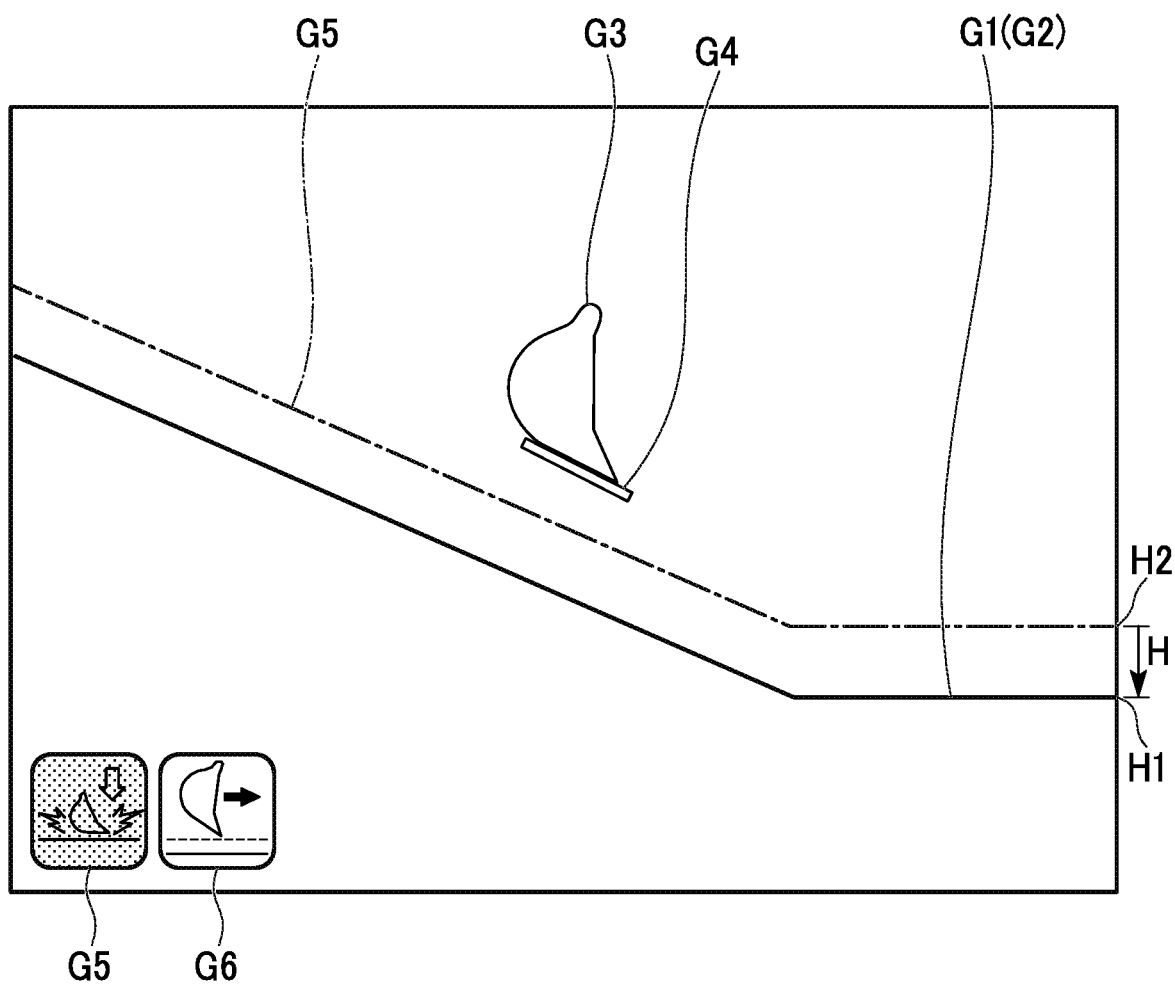
FIG. 19 is a second example of the screen displayed on the input/output device according to another embodiment when the offset function is disabled.

FIG. 19 is a second example of the screen displayed on the input/output device when the offset function has been switched from the display state of FIG. 17 where the offset function is enabled as another embodiment. As shown in FIG. 19, the position of the target line G1 may be returned to the original position H1 and a reference line G5 representing the position of the target line G1 when the offset is enabled may be displayed. It is to be noted that, in another embodiment, the control line G2 may also be displayed at the position where the target line G1 is displayed in FIG. 19.

Although the examples of FIGS. 7, 17, 18, and 19 have been described as examples in which at least one of the target line G1 and the control line G2 is displayed in a different form, the present invention is not limited thereto. For example, the color or transparency of the target line G1 or the control line G2 may be changed in another embodiment.

In addition, although the display control device 127 according to the above embodiments displays both the illustration G3 of the bucket 113 and the line segment G4 representing the bucket bottom surface 113A to display the position of the bucket 113, the present invention is not limited thereto. For example, the display control device 127 according to another embodiment may display one of the illustration G3 of the bucket 113 and the line segment G4 representing the bucket bottom surface 113A. The display control device 127 according to another embodiment may also display a point indicating the position of the cutting edge E of the bucket 113 instead of both the illustration G3 and the line segment G4.

Further, although the display control device 127 according to the above embodiments displays the rolling icon G5 and the offset icon G6, the rolling icon G5 may not be displayed and the offset icon G6 may not be displayed in another embodiment.

In addition, although the work implement control device 126 according to the above embodiments performs the intervention control when the work mode of the work implement 110 is the rolling mode, the present invention is not limited thereto. For example, the intervention control may not be performed when the work mode of the work implement 110 is the rolling mode in another embodiment.

Figure 20:
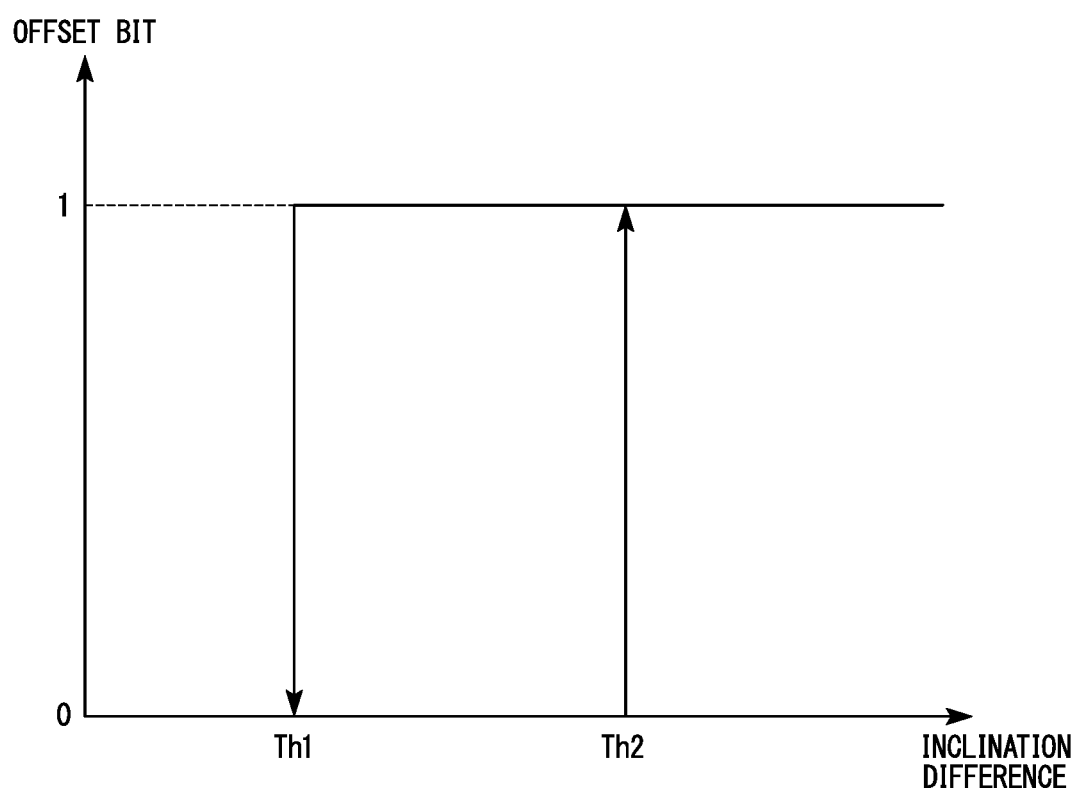
FIG. 20 is a diagram showing an example of hysteresis in display switching of a control line.

FIG. 20 is a diagram showing an example of hysteresis in display switching of a control line.

The display control device 127 according to the above embodiments determines the presence or absence of display of the control line G2 on the basis of whether or not the difference between the inclination of the bucket bottom surface 113A and the inclination of the target surface is equal to or greater than a predetermined angle. On the other hand, in another embodiment, the display control device 127 may set hysteresis to the angle used for determining the switching of display of the control line G2 such that the control line G2 does not flicker even when the difference between the inclination of the bucket bottom surface 113A and the inclination of the target surface changes above and below the predetermined angle. For example, as shown in FIG. 20, if the offset bit is 0, the display control device 127 switches the offset bit to 1 when the difference between the inclination of the bucket bottom surface 113A and the inclination of the target surface has become equal to or greater than Th2, and if the offset bit is 1, the display control device 127 switches the offset bit to 0 when the difference between the inclination of the bucket bottom surface 113A and the inclination of the target surface has become less than Th1.

Although the work implement control device 126 determines the work of the work implement 110 in the above embodiments, the present invention is not limited thereto. For example, the operator may manually set the work mode in the work implement control device 126 or the display control device 127 in another embodiment. Further, although the work implement control device 126 determines the work mode on the basis of the angle θ formed between the bucket bottom surface 113A and the target surface and then determines the offset bit on the basis of the work mode in the above embodiments, the present invention is not limited thereto. For example, the work implement control device 126 may determine the offset bit on the basis of the angle θ without determining the work mode or separately from the determination of the work mode in another embodiment.

Although the work mode is determined on the basis of the angle θ formed between the bucket bottom surface 113A and the target surface in the above embodiments, the present invention is not limited thereto. For example, the work implement control device 126 may determine that the work mode is the rolling mode upon determining that the work implement 110 repeatedly moves in the vertical direction in another embodiment. In this case, the work mode determinator 209 may analyze the time series of the operation amounts stored in the operation amount storage unit 202 and determine that an operation for repeatedly moving the work implement 110 in the vertical direction is being performed if an operation for switching the movement direction of the arm 112 or the boom 111 occurs a plurality of times within a predetermined time. In another embodiment, the work mode determinator 209 may analyze the time series of the operation amounts stored in the operation amount storage unit 202 and determine that an operation for repeatedly moving the work implement 110 in the vertical direction is being performed if the ratio between the amount of operation of the boom 111 at the timing when the movement direction of the boom 111 is switched and a value obtained by low-pass filtering the amount of operation of the boom 111 at that timing is equal to or greater than a predetermined value. It is to be noted that the rolling mode may be determined by a method other than the above. Then, when the work mode determinator 209 has determined that the work mode is the rolling mode, the display controller 308 may make the control line not be displayed.

Although the control line is made not to be displayed when it is determined that the work mode is the rolling mode in the above embodiments, the present invention is not limited to this example. For example, the control line may also be made not to be displayed when it is determined that the work mode is a ground-leveling mode. The ground-leveling mode is a work mode for leveling the ground by rubbing soil against the ground with the bucket bottom surface 113A. In the ground-leveling mode (ground leveling work), the bucket bottom surface 113A is rubbed against the target surface with the bucket bottom surface 113A facing the target surface. Therefore, it may be determined that the work mode is the ground-leveling mode on the basis of the angle θ formed between the bucket bottom surface 113A and the target surface, and the ground-leveling mode may also be determined on the basis of other methods.

In another embodiment, the functions of the display control device may be realized by a plurality of devices. For example, in another embodiment, some or all of the functions of the display control device 127 may be provided in the work implement control device 126. In another embodiment, some or all of the functions of the display control device 127 may also be realized by another device provided in the hydraulic excavator 100 or another device (such as a mobile terminal or a server device) connected via a network. In such a case, a plurality of such devices or a combination thereof is an example of the display control device. Further, in another embodiment, the display control device 127 or the input/output device 128 may be provided around a remote operation seat installed outside the hydraulic excavator 100.

INDUSTRIAL APPLICABILITY

According to the above aspects, it is possible to prevent confusion of the operator of the work machine when the control line of the work machine is switched between states with and without an offset.

The invention claimed is:

1. A display control device for a work machine that has a work implement including a bucket and is configured to construct a construction object, the display control device comprising:
a processor configured to:
generate a display signal including at least one of a target line of the construction object or a control line different from the target line, the control line indicating a depth that the bucket is not allowed to enter when the construction object is constructed,
determine whether a work state of the work machine corresponds to a predetermined work state,
based on determining that the work state of the work machine corresponds to the predetermined work state, cause the target line to be displayed without causing the control line to be displayed,
generate a first display signal for causing the control line to be displayed based on determining that the work state does not correspond to the predetermined work state, and
display an illustration of the bucket and a line segment representing a bottom surface of the bucket, the line segment being in contact with a bottom line of the illustration of the bucket and protruding toward the control line or the target line relative to an end of the bottom line.

2. The display control device according to claim 1, wherein the processor is further configured to, based on determining that the work state of the work machine does not correspond to the predetermined work state, acquire an offset distance of the control line and to display the control line at a position offset from the target line based on the offset distance.

3. The display control device according claim 1, wherein, when the work state of the work machine is the predetermined work state, an angle formed between the bucket and the target line is less than a predetermined value.

4. The display control device according to claim 3, wherein the predetermined work state includes a rolling mode or a ground-leveling mode.

5. The display control device according to claim 1, wherein the processor is further configured to:
receive an input of offset setting information indicating whether or not to set an offset function for the control line, and
wherein the processor is configured to, based on determining that the work state of the work machine does not correspond to the predetermined work state, make a display form of the control line in the display signal, the display form being different based on whether the offset function is enabled in response to the input of the offset setting information.

6. The display control device according to claim 1, wherein the processor is further configured to, based on determining that the work state of the work machine does not correspond to the predetermined work state, specify a display form of the control line based on an angle formed between the bucket and the target line of the construction object, and
wherein the processor is configured to cause the control line to be displayed based on the angle formed between the bucket and the target line being equal to or greater than a predetermined value.

7. A work machine, comprising:
the display control device according to claim 1; and
the work implement including the bucket.

8. The display control device according claim 1, wherein the line segment extends further than a bottom end of the illustration of the bucket.

9. The display control device according claim 1, wherein the display control device is configured to:
determine an angle defined between the line segment and the target line; and
determine that the work state of the work machine is the predetermined work state based on the angle defined between the line segment and the target line being less than a predetermined value.

10. The display control device according claim 1, wherein the processor is configured to display an icon indicating whether or not the work state of the work machine is the predetermined work state.

11. The display control device according to claim 1, wherein the line segment has a rectangular shape.

12. A display device for a working machine, the working machine being configured to construct a construction object, the display device comprising:
a display unit configured to display at least one of a target line of the construction object or a control line different from the target line, the control line indicating a depth that a bucket of the work machine is not allowed to enter when the construction object is constructed,
wherein the display device is configured to:
based on a determination that a work state of the work machine corresponds to a predetermined work state, cause the display unit to display the target line without causing the control line to be displayed,
generate a first display signal for causing the control line to be displayed based on determining that the work state does not correspond to the predetermined work state, and
display an illustration of the bucket and a line segment representing a bottom surface of the bucket, the line segment being in contact with a bottom line of the illustration of the bucket and protruding toward the control line or the target line relative to an end of the bottom line.

13. A display control method, comprising:
generating a display signal including a target line of a construction object or a control line different from the target line, the control line indicating a depth that a bucket of a work machine is not allowed to enter when the construction object is constructed;
determining whether a work state of the work machine corresponds to a predetermined work state;
based on determining that the work state of the work machine corresponds to the predetermined work state, causing the target line to be displayed without causing the control line to be displayed;

generating a first display signal for causing the control line to be displayed based on determining that the work state does not correspond to the predetermined work state; and displaying an illustration of the bucket and a line segment representing a bottom surface of the bucket, the line segment being in contact with a bottom line of the illustration of the bucket and protruding toward the control line or the target line relative to an end of the bottom line.

* * * * *